US010794536B2

(12) United States Patent
Adkins

(10) Patent No.: US 10,794,536 B2
(45) Date of Patent: Oct. 6, 2020

(54) VACUUM ACQUISITION SYSTEMS AND METHODS

(71) Applicant: CRYOGENIC FUELS INC., Fairfax, VA (US)

(72) Inventor: Roy E. Adkins, Catlett, VA (US)

(73) Assignee: CRYOGENIC FUELS INC., Sumerduck, VA (US)

( * ) Notice: Subject to any disclaimer, the term of this patent is extended or adjusted under 35 U.S.C. 154(b) by 300 days.

(21) Appl. No.: 15/827,354

(22) Filed: Nov. 30, 2017

(65) Prior Publication Data

US 2019/0162366 A1    May 30, 2019

(51) Int. Cl.
*F04B 37/08* (2006.01)
*F17C 3/08* (2006.01)
*F17C 5/02* (2006.01)

(52) U.S. Cl.
CPC .............. *F17C 3/085* (2013.01); *F17C 3/08* (2013.01); *F17C 5/02* (2013.01); *F17C 2201/0104* (2013.01); *F17C 2201/0109* (2013.01); *F17C 2201/056* (2013.01); *F17C 2203/0391* (2013.01); *F17C 2203/0629* (2013.01); *F17C 2209/234* (2013.01); *F17C 2221/012* (2013.01); *F17C 2221/033* (2013.01); *F17C 2223/0161* (2013.01); *F17C 2223/033* (2013.01); *F17C 2225/0161* (2013.01); *F17C 2225/033* (2013.01); *F17C 2227/0306* (2013.01); *F17C 2227/0309* (2013.01); *F17C 2227/044* (2013.01); *F17C 2227/045* (2013.01); *F17C 2250/032* (2013.01); *F17C 2250/043* (2013.01); *F17C 2250/046* (2013.01); *F17C 2250/0439* (2013.01); *F17C 2250/0447* (2013.01); *F17C 2250/0663* (2013.01); *F17C 2260/033* (2013.01); *F17C 2260/044* (2013.01); *F17C 2270/0168* (2013.01)

(58) Field of Classification Search
CPC .......... F04B 37/08; F04B 37/085; F17C 3/08; F17C 3/085; F17C 2203/0391
See application file for complete search history.

(56) References Cited

U.S. PATENT DOCUMENTS

| 3,130,561 | A | 4/1964 | Hnilicka, Jr. |
| 4,502,296 | A | 3/1985 | Ogata et al. |
| 4,842,909 | A | 6/1989 | Brassell |

(Continued)

*Primary Examiner* — Frantz F Jules
*Assistant Examiner* — Erik Mendoza-Wilkenfel
(74) *Attorney, Agent, or Firm* — Clark & Brody LP

(57) ABSTRACT

A method for generating an insulating vacuum in a container is provided. The method includes evacuating air from a space between double walls of the container for a first predetermined time period. The method also includes after the first predetermined time period, if a vacuum level within the space has not reached a first predetermined vacuum level, purging the space by supplying a gas into the space and subsequently evacuating the air from the space for a period of time equal to the first predetermined time period. The method also includes repeating the evacuating and purging until the vacuum level within the space reaches the first predetermined vacuum level. The method also includes when the vacuum level within the space reaches the first predetermined vacuum level, evacuating the air from the space for a second predetermined time period.

8 Claims, 12 Drawing Sheets

(56) References Cited

U.S. PATENT DOCUMENTS

| | | | |
|---|---|---|---|
| RE33,878 E | | 4/1992 | Bartlett et al. |
| 5,520,002 A | * | 5/1996 | Ishikawa ............... C23C 14/564 |
| | | | 62/55.5 |
| 7,297,055 B2 | | 11/2007 | Sar et al. |
| 7,806,365 B2 | | 10/2010 | Miller et al. |
| 2002/0094277 A1 | * | 7/2002 | Gaudet ................... F04B 37/08 |
| | | | 417/44.1 |
| 2010/0269911 A1 | * | 10/2010 | Baltussen .............. B82Y 10/00 |
| | | | 137/14 |
| 2013/0118184 A1 | | 5/2013 | Groholski et al. |
| 2014/0109973 A1 | * | 4/2014 | Neumeister ........... F16K 27/003 |
| | | | 137/1 |
| 2016/0245270 A1 | * | 8/2016 | Yatsu ................... F04B 49/065 |

\* cited by examiner

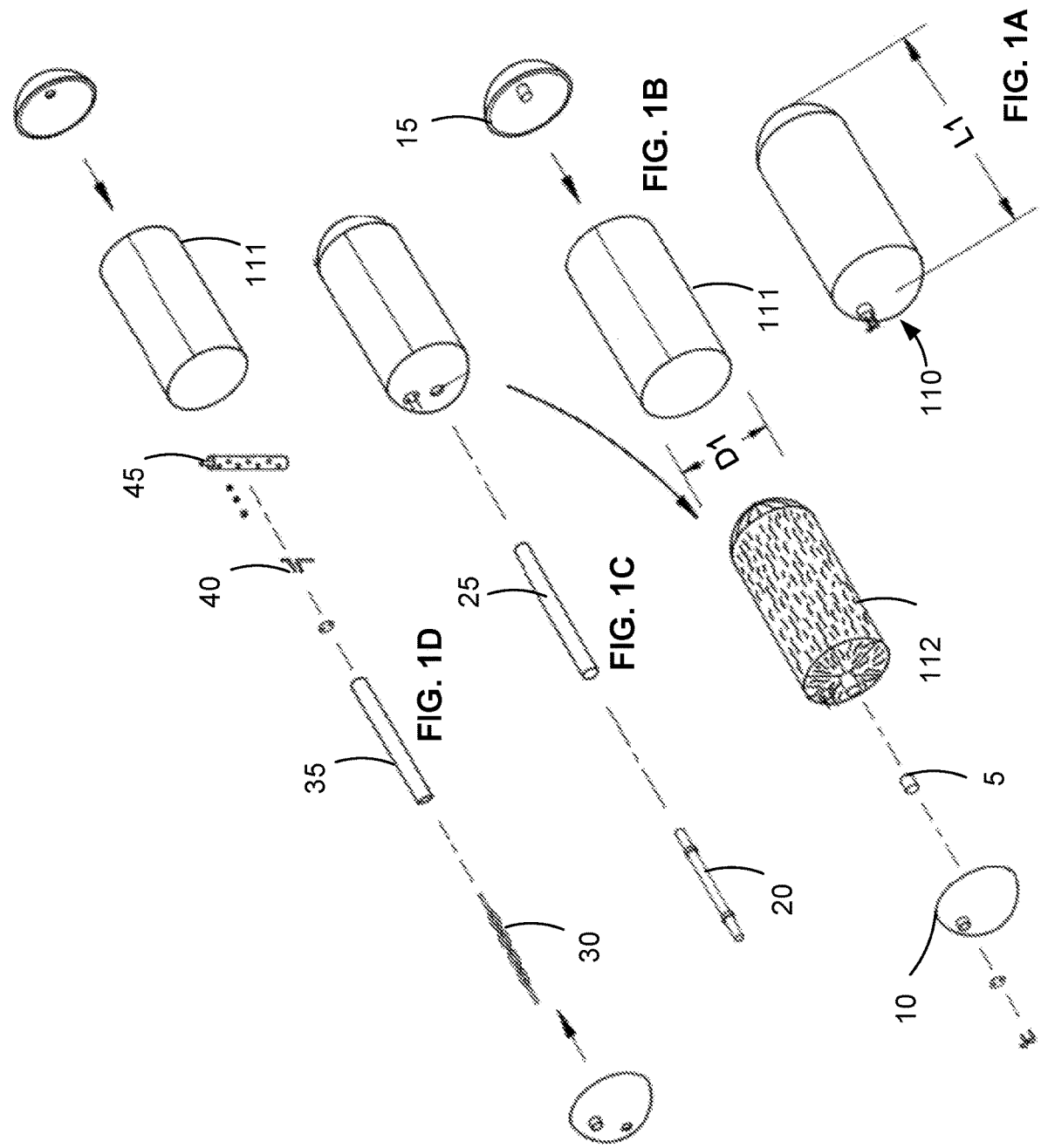

VACUUM ACQUISITION SYSTEMS AND METHODS

TECHNICAL FIELD

The present disclosure relates generally to vacuum acquisition systems and methods and, more specifically, to vacuum acquisition systems and methods for acquiring a predetermined vacuum level within an insulation space of a container.

BACKGROUND

Due to environmental benefits, cryogenic liquids, such as liquefied natural gas (LNG), have become increasingly widely used as alternative clean fuels for powering vehicles. LNG is typically stored at temperatures ranging from −260° F. to −200° F. in a storage tank and can be transferred or dispensed to vehicle tanks at a gas station. An LNG tank may have a double wall configuration, which includes an inner pressure vessel configured to store the LNG and an insulation space surrounding the pressure vessel. The insulation space may include insulations materials installed therein to maintain the temperature of the LNG stored in the pressure vessel. Conventional industrial cryogenic containers (including LNG tanks) are typically designed and manufactured to provide an annulus (i.e., the insulation space within the container) having a vacuum level of about $1 \times 10^{-3}$ torr (or $133.3 \times 10^{-3}$ Pa). While this vacuum level may be acceptable for end use of certain cryogenic fluid, such as liquid nitrogen, oxygen and carbon dioxide, in certain commercial and industrial applications, it is not suitable for LNG vehicular fuel tanks.

It is thus desirable to provide a vacuum acquisition system and method for acquiring a much higher vacuum level within containers suitable for storage and transport of LNG.

SUMMARY

In accordance with various exemplary embodiments of the present disclosure, a method for generating an insulating vacuum in a container is provided. The method includes evacuating air from a space between double walls of the container for a first predetermined time period. The method also includes after the first predetermined time period, if a vacuum level within the space has not reached a first predetermined vacuum level, purging the space by supplying a gas into the space and subsequently evacuating the air from the space for a period of time equal to the first predetermined time period. The method also includes repeating the evacuating and purging until the vacuum level within the space reaches the first predetermined vacuum level. The method also includes when the vacuum level within the space reaches the first predetermined vacuum level, evacuating the air from the space for a second predetermined time period. The method also includes after the second predetermined time period, if the vacuum level within the space has not reached a second predetermined vacuum level, purging the space and subsequently evacuating the air from the space for a period of time equal to the second predetermined time period. The method also includes repeating the evacuating and purging until the vacuum level within the space reaches the second predetermined vacuum level. The method also includes when the vacuum level within the space reaches the second predetermined vacuum level, condensing the air within the space for a third predetermined time period. The method also includes after the third predetermined time period, if the vacuum level within the space has not reached a third predetermined vacuum level, purging the space and subsequently evacuating the air from the space for a period of time equal to the third predetermined time period. The method further includes repeating the evacuating and purging until the vacuum level within the space reaches the second predetermined vacuum level.

In accordance with various exemplary embodiments of the present disclosure, a system for acquiring a vacuum level in a space of a container is provided. The system includes at least one roughing pump, a turbo pump, a cryogenic pump, and a vacuum manifold. The at least one roughing pump, the turbo pump, and the cryogenic pump are fluidly coupled to the vacuum manifold. The vacuum manifold is fluidly coupled to the space of the container. The system also includes a controller configured to control operations of the at least one roughing pump, the turbo pump, and the cryogenic pump. The controller is configured to control the at least one roughing pump to evacuate the space, initiate supplying a gas into the space to purge the space, control the turbo pump to further evacuate the space, and control the cryogenic pump to condense air in the space and remove water vapor from the air. The controller is further configured to operate each pump for a predetermined period of time and to determine a vacuum level of the space after each predetermined period of time.

In accordance with various exemplary embodiments of the present disclosure, a non-transitory computer-readable medium is provided. The non-transitory computer-readable medium is encoded with instructions that, when executed by a processor, cause the processor to perform a method for generating a vacuum level in a space of a tank. The method includes pumping air from the space for a first predetermined time period. The method also includes within the first predetermined time period, determining whether a vacuum level within the space has reached a first predetermined vacuum level. The method also includes when determining that the vacuum level within the space reaches the first predetermined vacuum level, supplying a purge gas into the space to purge the space, and subsequently repeating pumping the air from the space and determining whether the vacuum level within the space has reached the first predetermined vacuum level. The method also includes when determining that the vacuum level within the space has reached the first predetermined vacuum level, pumping the air from the space for a second predetermined time period until the vacuum level within the space reaches a second predetermined vacuum level. The method further includes pumping the air from the space to remove at least water vapor from the air for a third predetermined time period and repeating pumping the air from the space and supplying the purge gas into the space to purge the space until the vacuum level within the space reaches a third predetermined vacuum level.

Additional objects and advantages will be set forth in part in the description which follows, and in part will be obvious from the description, or may be learned by practice of the present teachings. The objects and advantages of the present disclosure will be realized and attained by means of the elements and combinations particularly pointed out in the appended claims.

It is to be understood that both the foregoing general description and the following detailed description are exemplary and explanatory only and are not restrictive of the claimed subject matter. The accompanying drawings, which are incorporated in and constitute part of this specification, illustrate exemplary embodiments of the present disclosure and together with the description, serve to explain principles of the present disclosure.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein:

FIG. 1A illustrates a perspective view of a tank 110 in accordance with the present disclosure;

FIG. 1B illustrates an exploded view of the tank shown in FIG. 1A, showing an inner pressure vessel and an outer shell in accordance with the present disclosure;

FIG. 1C illustrates structures for supporting the pressure vessel of the tank in accordance with the present disclosure;

FIG. 1D illustrates additional components of the tank in accordance with the present disclosure;

Figure 1E:
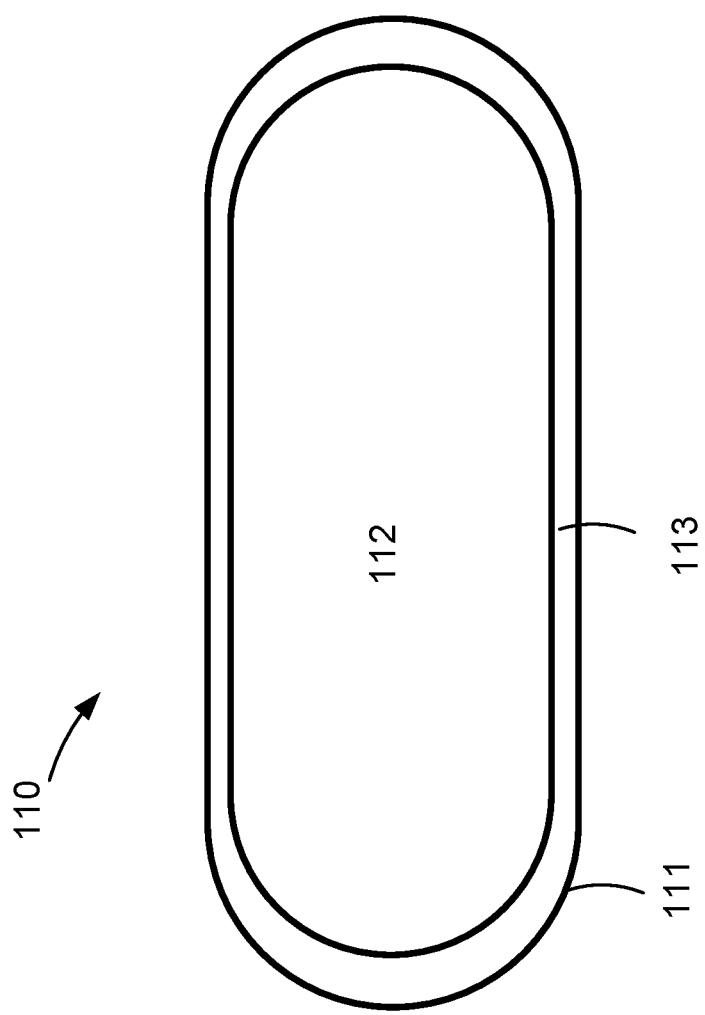
FIG. 1E illustrates a schematic cross-section of the tank in accordance with the present disclosure.

Although the following detailed description makes reference to exemplary illustrative embodiments, many alternatives, modifications, and variations thereof will be apparent to those skilled in the art. Accordingly, it is intended that the claimed subject matter be viewed broadly.

DETAILED DESCRIPTION

Reference will now be made in detail to various exemplary embodiments, examples of which are illustrated in the accompanying drawings. The various exemplary embodiments are not intended to limit the disclosure. To the contrary, the disclosure is intended to cover alternatives, modifications, and equivalents of the exemplary embodiments. Various mechanical, compositional, structural, electrical, and operational changes may be made without departing from the scope of this description and the claims, including equivalents. In some instances, well-known structures and techniques have not been shown or described in detail so as not to obscure the disclosure. In the drawings and the description, similar elements are provided with similar reference numerals. It is to be noted that the features explained individually in the description can be mutually combined in any technically expedient manner and disclose additional embodiments of the present disclosure. That is, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Further, this description's terminology is not intended to limit the disclosure. For example, spatially relative terms—such as "beneath", "below", "lower", "above", "upper" and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes includes various special device positions and orientations. In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

The term "conduit" used herein refers to lines, passages, pipes, hoses, tubes, etc., that may be configured for transferring fluid, such as liquid, gas, vapor, etc. The term "conduit" may also include other components disposed along the pipes or passages, such as sensors, valves, flow meters, etc.

The term "container" and the term "tank" are used herein interchangeably. The term "container" or "tank" refers to an enclosed storage space having a suitable shape for storing fluids, such as cryogenic fluids or gases.

In the present disclosure, when referring to a predetermined value being "reached," it means that a measured value (e.g., a pressure or a vacuum level) is within a predetermined tolerance (e.g., a range) associated with the predetermined value. In some embodiments, it also means that the measured value is greater than or equal to, or lower than or equal to the predetermined value, depending on circumstances as will be discussed with respect to the example embodiments disclosed herein.

The term "air" used herein refers to anything that may be present in an atmosphere of a space, such as an insulation space of a tank. For example, the term "air" may include one or more of a gas, water vapor, a vapor of a liquid other than water, dust, etc.

In the present disclosure, the vacuum level is quantified by a numerical pressure value, e.g., $1\times10^{-3}$ torr. The larger the numerical pressure value, the lower the vacuum level, and the smaller the numerical pressure value, the higher the vacuum level. For example, a vacuum level of $1\times10^{-3}$ torr is lower than a vacuum level of $1\times10^{-6}$ torr. References a "high-level" vacuum herein generally refer to a vacuum having a pressure value of less than or equal to about $1\times10^{-6}$ torr.

The present disclosure relates to vacuum acquisition systems and methods for acquiring a vacuum level suitable for storage and transport of cryogenic liquid, such as LNG. In accordance with one aspect of the present disclosure, systems and methods for acquiring a vacuum having a pressure value of $1\times10^{-6}$ torr (e.g., $1\times10^{-6}$ or less) within a space (e.g., an insulation space) of a fluid container, such as an LNG vehicular tank. For convenience and simplicity, LNG is used as an example cryogenic liquid in the following discussion of the systems and methods of the present disclosure. It is understood that the disclosed systems and methods may also be used for manufacturing containers configured to store other cryogenic liquids, such as liquid oxygen, liquid hydrogen, liquid helium, etc.

The vacuum acquisition systems and methods of the present disclosure can be used to achieve a high vacuum level of at least $1\times10^{-6}$ torr (e.g., $1\times10^{-6}$ torr or a lower value) within the insulation space of an LNG tank. During the vacuum acquisition process, the LNG tank may be placed within a bake out oven and preset pumping and purging procedures may be applied to the tank. The bake out oven may be filled with hot nitrogen gas to maintain a controlled environment at a suitable temperature, such as a temperature within a range of 180° F. to 200° F. During the vacuum acquisition process, sound waves may be introduced into the oven and directed toward the outer surfaces of the tank. As the sound waves travel through a medium, they cause particles of that medium to vibrate. In this way, the sound waves introduced into the oven may cause vibration within the tank, including the insulation space. The vibration may facilitate molecules (e.g., air molecules, moisture (e.g., water vapor) molecules) to detach from insulation materials while a vacuum force is applied by a vacuum pump to suck out the molecules.

During the vacuum acquisition process, a purge gas, such as nitrogen gas, may be supplied into the insulation space of the tank to purge out air and/or moisture from the insulation materials and the insulation space. The pumping and purging operations may be performed alternately for multiple cycles based on a predetermined procedure until a predetermined vacuum level has been reached within the insulation space of the tank. After the vacuum acquisition process is complete and the tank is removed from the oven, the tank may be cooled down, and the vacuum level within the insulation space may be slightly reduced from the level reached during the vacuum acquisition process (e.g., a value of $1\times10^{-7}$ torr or lower) to a desired or target level (e.g., $1\times10^{-6}$ torr). The vacuum level achieved within the tank insulation space may be maintained for a long period of time (e.g., 10 years, 20 years) before re-pumping is needed.

Various methods may be used to maintain the vacuum level. In some embodiments, the vacuum level may be maintained by the activated charcoal material in the insulation space and silver zeolite gettering materials installed in a central beam of the tank. During tank manufacturing, all materials and parts that will be exposed to the vacuum in the insulation space are stored in a cleaned condition within a controlled environment at 15 to 20% relative humidity. The insulation layup within the insulation space and the installation of the pressure vessel within an outer shell of the tank will also be performed in a controlled clean room environment with 15 to 20% relative humidity control.

A system for acquiring a vacuum, in accordance with the present disclosure, may include, for example, a structure for holding or containing the tank during a heating process, such as an oven. The system may include devices for heating up the oven. For example, the system may include a heater to heat up the air inside the oven. In some embodiments, the system may include a hot gas supply line configured to supply a hot gas into the oven to heat up the oven. The system may include means for creating vibrations within an insulation space of the tank. For example, the system may include an acoustic source, such as one or more loud speakers for introducing sound waves into the oven to cause vibrations in the tank, including the insulation space. The system may include a vacuum pumping subsystem that may include at least one pump configured to draw air and/or gas out of the insulation space of the tank. The vacuum pumping subsystem may include various valves, sensors, meters, pipes, conduits, couplings, etc., for providing a fluid flow path for the air and/or gas flow and for controlling air and/or gas flow during the vacuum acquisition process. The system may include a controller programmed with computer instructions or codes to perform controls of various devices included in the system.

An LNG storage transport tank manufactured and/or processed using the methods and/or systems disclosed herein is insulated by a space having a vacuum sufficient to maintain LNG at temperatures ranging from −260° F. to −200° F. during transport. In an example embodiment, the storage transport tank may have a double wall configuration, with a space separating the walls forming the tank. The space may be configured to maintain the LNG within the tank at temperatures ranging from −260° F. to −200° F. during both storage and transport of the LNG. The configuration of the space may include, for example, providing insulation materials within the space. In addition, the configuration of the space may include acquiring and maintaining a vacuum of at least $1 \times 10^{-6}$ torr or lower within the space.

The LNG tank manufactured using the disclosed systems and methods includes a high vacuum level (e.g., $1 \times 10^{-6}$ torr or a less value) within the insulation space of the tank. With materials such as activated charcoal and silver zeolite gettering materials disposed within the tank, the high vacuum level can be maintained within the insulation space of the tank for a long period of time, e.g., 20 years, before re-pumping is needed. The high vacuum level may be maintained for the long period of time when the tank is under normal storage, transportation, and working conditions. The high vacuum level within the insulation space of the tank helps maintain the LNG stored within a pressure vessel surrounded by the insulation space at a desired temperature, thereby reducing loss of LNG due to evaporation during transportation. In addition, when the high vacuum level can be maintained for a long period of time, re-pumping frequency over the life of the tank can be reduced, thereby reducing maintenance costs.

Turning now to the drawings, FIGS. 1A-1E are schematic illustrations of an exemplary tank 110 in accordance with the disclosed embodiments. FIG. 1A illustrates a perspective view of the exemplary tank 110. FIG. 1B illustrates an exploded view of the exemplary tank 110, showing an inner pressure vessel and an outer shell. FIG. 1C illustrates exemplary structures for supporting the pressure vessel. FIG. 1D illustrates additional exemplary components of the tank 110. FIG. 1E illustrates a schematic cross section of the exemplary tank 110.

As noted above, LNG may be stored and transported in tanks, such as, for example, tank 110. The tank 110 may be configured to store a cryogenic liquid, such as LNG. In some embodiments, the tank 110 may be configured as a vehicular fuel tank for storing LNG for fueling a vehicle. In some embodiments, the tank 110 may be configured for other applications, such as a storage tank in a fueling station, or a storage tank for transporting the LNG. A tank 110 configured in accordance with the present disclosure may maintain a $10^{-6}$ torr vacuum level for a long period of time, such as 10 years, 20 years, etc., without the need for re-pumping, when the tank 110 is subject to use as a typical fleet vehicle under over-the-road conditions including vibration and shock loading.

As shown in FIG. 1A, tank 110 may have a substantially cylindrical shape. The tank 110 may have any other suitable shapes. In some embodiments, tank 110 may have a length of L1 of about 41 inches (or 1.04 meter), and a diameter of D1 of about 23.5 inches (or 0.60 meter) (shown in FIG. 1B). Tank 110 may include other sizes and shapes. FIG. 1B shows that the tank 110 may include a double-wall configuration, including an outer shell 111 and an inner pressure vessel 112. The tank 110 may include a beam end support fitting 5 and two head assemblies 10 and 15. FIG. 1C shows that the tank 110 may include a beam 10 and a tube 15 configured to provide support to the pressure vessel 112. In some embodiments, the beam 10 may be a fiberglass beam, although the beam 10 may be made of other materials. The tube 15 may be made of any suitable material, such as metal (e.g., steel, aluminum, etc.). FIG. 1D shows that the tank 110 may include one or more fill and vent tubes 30, a tube 35, one or more additional fill and vent tubes 40, and an aluminum density probe 45. It is understood that the tank 110 may include more or fewer components than what are shown in FIGS. 1A-1D.

FIG. 1E illustrates a schematic cross section of the exemplary tank 110. As illustrated in FIG. 1E, tank 110 may have a double-wall configuration, having the outer shell 111, an inner vessel such as the inner pressure vessel 112, and a space between the inner vessel 112 and outer shell 111, such as for example, an insulation space 113. In some embodiments, the insulation space 113 may be an annular space 113 surrounding the pressure vessel 112 and configured to have a vacuum therein. Although discussed herein with regard to an annular space 113, the present disclosure is not so limited, and the systems and methods disclosed herein may be applied to storage transport tanks having insulation spaces with different geometries.

The annular space 113 may be insulated to maintain the desired temperature within the inner pressure vessel 112. Insulation materials may be disposed in the annular space 113 to insulate pressure vessel 112. In some embodiments, the annular space 113 may contain a multi-layer aluminized mylar with nylon net spacers. For example, in some embodiments, the annular space 113 may contain 14-25 layers of double aluminized (e.g., 4 mil) mylar with each layer separated by nylon mosquito netting. In one exemplary embodiment, 25 layers of the insulation described above are provided. As will be understood by those of skill in the art, more or fewer layers may be used. In addition to insulation, the annular space 113 may include other structures and/or coatings to assist in maintaining the desired temperature within the inner pressure vessel. For example, in some embodiments, the annular space 113 may also contain an amount of (e.g., 5 oz. or 141.7 gram) of activated charcoal material placed against the outer surface of the inner pressure vessel 112.

In addition to the materials positioned within the annular space 113, the insulative capabilities of the space are further enhanced by removing elements from the space. For example, vacuum acquisition systems and methods of the present disclosure may be used to remove the moisture, air, and/or gas from the annular space 113 to achieve a desired vacuum. For example, water vapor, air, and/or gas may be evacuated from the annular space 113 using a vacuum pump.

To facilitate the evacuation of the water vapor, air, and/or gas, sound waves may be used to generate vibrations within the annular space 113, for example, by directing sound waves toward the outer shell 111 of the tank 110 using a loud speaker. The sound waves may cause vibrations in the tank 110, including vibrations in the insulation materials contained within the annular space 113. Such vibrations may increase the movement of the moisture, air, and/or gas molecules within the annular space 113, thereby facilitating the evacuation of the molecules during a vacuuming process. In some embodiments, the tank 110 may be heated, further facilitating the evacuation of the moisture, air, and/or gas from the annular space 113 during the vacuum acquisition process. Heat may be introduced by a heater or using a hot gas, such as nitrogen gas.

Figure 2A:
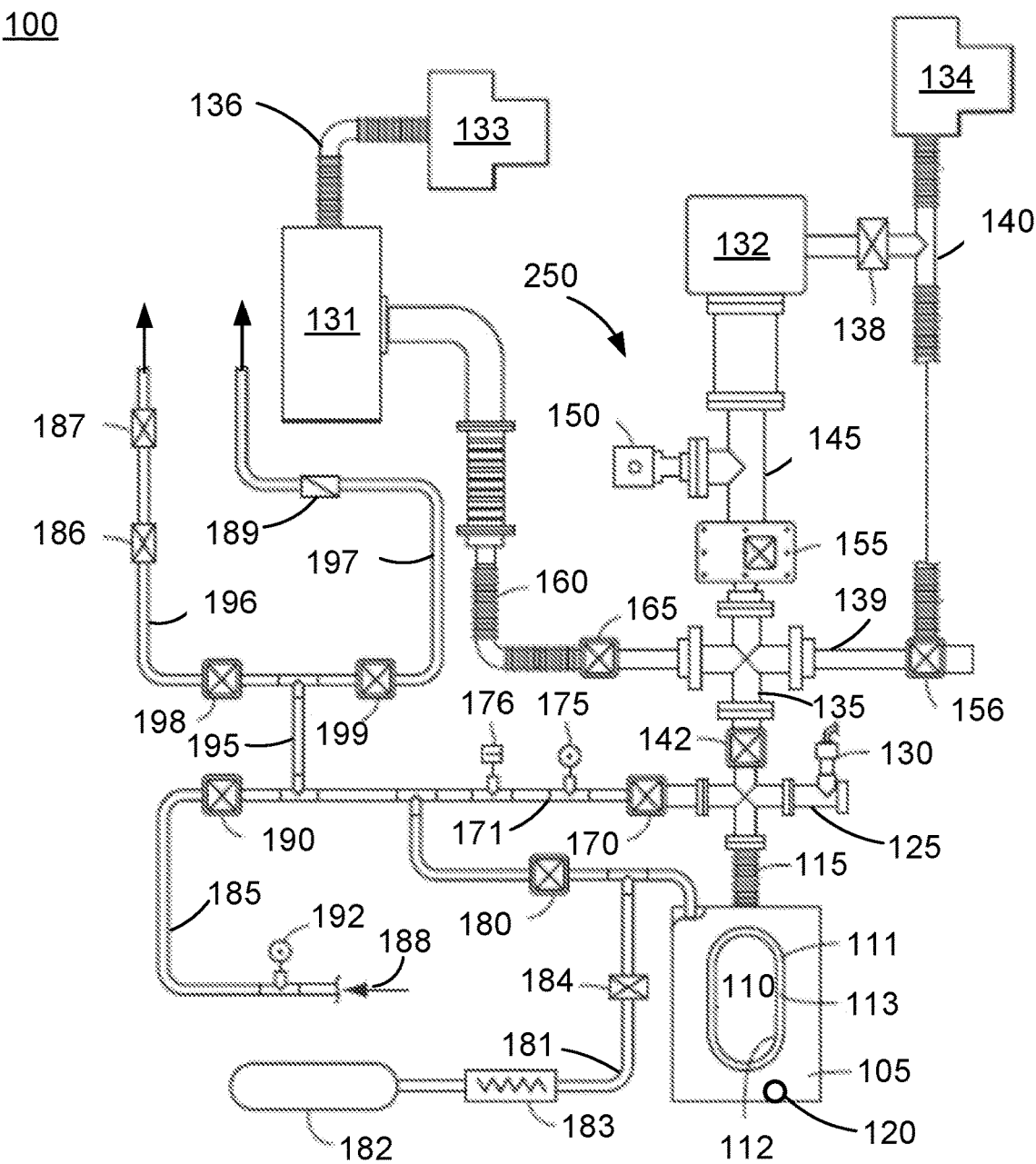
FIG. 2A is a schematic illustration of a vacuum acquisition system in accordance with the present disclosure.

FIG. 2A illustrates an exemplary vacuum acquisition system 100. The system 100 may include an oven 105. The oven 105 may define an enclosed space, within which one or more tanks 110 may be stored during the manufacturing process for acquiring a predetermined vacuum level in the annular space 113 of the tank 110. The oven 105 may be made of any suitable materials, such as wood, concrete, steel, etc. For example, in some embodiments, the oven 105 may be a plywood box. In some embodiments, the size of the oven 105 may vary depending on the size of the tank 110, or the number of tanks 110 placed in the oven 105. In some embodiments, the oven 105 may have two or more tanks 110 placed therein during a manufacturing process. In some embodiments, the system 100 may include two or more ovens 105, each oven 105 may include two or more tanks 110, as shown in, e.g., FIG. 3. That is, the system 100 may be configured to acquire a desired vacuum level within the annular spaces 113 of multiple tanks 110 simultaneously.

The system 100 may include an acoustic source 120, such as an audio source or a loud speaker, disposed at least partially within the oven 105. The acoustic source 120 may be configured to generate sound waves within the oven 105 to induce vibration. Non-limiting examples of vibration inducing elements include music, such as jazz music, rock-n-roll music, high frequency sound, loud sound that is louder than normal listening levels, ultrasonic waves, etc. In some embodiments, the acoustic source 120 may direct sound waves toward the tank 110. The sound waves may cause vibrations in the tank 110, thereby facilitating the movement of molecules inside the annular space 113 of the tank 110, including the moisture molecules (e.g., small water vapor droplets) inside insulation layers disposed within the annular space 113 of the tank 110. The sound may help shake out the moisture molecules from the insulation layers such that the moisture molecules may be evacuated out of the annular space 113 during a vacuum acquisition process.

The tank 110 may be fluidly coupled to other components of the system 100 outside of the oven 105 via one or more conduits 115. The conduit 115 may be any suitable pipe, tube, channel, or duct, which may be flexible or rigid. The conduit 115 may fluidly couple the tank 110 with a vacuum manifold 125. Various devices may be disposed in, along, or coupled to the vacuum manifold 125. For example, as shown in FIG. 2A, a vacuum gauge 130 may be coupled to the vacuum manifold 125. The vacuum gauge 130 may be configured to measure the vacuum level within the vacuum manifold 125, which is substantially the same as the vacuum level within the annular space 113 of the tank 110. Thus, the vacuum level measured by the vacuum gauge 130 indicates the vacuum level of the annular space 113 of the tank 110.

As shown in FIG. 2A, a plurality of pumps 131, 132, 133, and 134 may be fluidly coupled to the vacuum manifold 125 through a pump manifold 139 and a conduit 135. A valve 142 may be disposed in, along, or fluidly coupled to the conduit 135. The valve 142 may be a control valve configured to open to allow the pumps 131, 132, 133, and 134 to fluidly communicate with the vacuum manifold 125, thereby fluidly communicating with the tank 110, or to close to isolate the vacuum manifold 125 (and hence the tank 110) from the pumps 131, 132, 133, and 134.

In the embodiments shown in FIG. 2A, the pump 131 may be a turbo pump (or a turbo-molecular pump), the pump 132 may be a cryogenic pump (or cryo-pump), the pump 133 may be a first roughing pump, and the pump 134 may be a second roughing pump. The turbo pump 131 may be a propellant pump having a rotodynamic pump and a driving gas turbine. Any suitable turbo pump 131 may be used. For example, the turbo pump 131 may be a centrifugal pump or an axial-flow pump.

The cryogenic pump 132 may be any suitable vacuum pump configured to condense vapor or gas onto a condensing surface or array (e.g., a cold metal surface or array). As the vapor or gas collides with the cold metal surface, the vapor or gas may condense into liquid forms and attach to the cold metal surface. In some embodiments, the cryogenic pump 132 may be associated with a dedicated cryogenic pump controller (not shown).

The first and second roughing pumps 133 and 134 may be configured to initiate evacuation of the vacuum acquisition system 100 as an initial stage for achieving a predetermined vacuum level in the annular space 113 of the tank 110. The roughing pumps 133 and 134 may be configured to produce a first or intermediate vacuum level of $1\times10^{-3}$ torr (or 0.1 Pa).

A shown in FIG. 2A, the first roughing pump 133 may be fluidly coupled with the turbo pump 131 through a conduit 136. The conduit 136 may include one or more flexible pipes. The second roughing pump 134 may be fluidly coupled with the cryogenic pump 132 through a conduit 137. A purge valve 138 may be disposed in the conduit 137 between the cryogenic pump 132 and the second roughing pump 134. The second roughing pump 134 may also fluidly couple with a pump manifold 139 through a conduit 140 and a valve 156. The conduit 137 and the conduit 140 may be fluidly coupled with one another at a location between the purge valve 138 and the second roughing pump 134. The open and close of the purge valve 138 may allow and disallow the fluid coupling between the cryogenic pump 132 and the conduit 140. In some embodiments, the purge valve 138 may be configured to control an amount of gas to be purged.

The cryogenic pump 132 may be fluidly coupled with the pump manifold 139 through a conduit 145. A plurality of devices may be disposed in, along, or coupled to the conduit 145. For example, system 100 may include a residual gas analyzer 150 fluidly coupled to the conduit 145 upstream of the cryogenic pump 132 (e.g., upstream of a suction inlet of the cryogenic pump 132). Any suitable residual gas analyzer may be used. For example, the residual gas analyzer 150 may be an open ion source type analyzer or a closed ion source analyzer. The residual gas analyzer 150 may be configured to detect impurities (e.g., a gas, a vapor, dust, etc.) within a vacuum environment (e.g., the vacuum environment within the conduit 145) at a vacuum level down to $10^{-14}$ torr. In some embodiments, the residual gas analyzer 150 may have a sensitivity of $1\times10^{-11}$ torr. The residual gas analyzer 150 may be configured to detect residual gases in the vacuum acquisition system 100. For example, during the vacuum acquisition process (e.g., pump down of the tank 110), the residual gas analyzer 150 may be used to monitor residual gases in the annular space 113 of the tank 110. The residual gas analyzer 150 may also be configured to detect helium leak on the pressure vessel 112 and the outer shell 111 of the tank 110.

The system 100 may also include a valve 155 disposed in the conduit 145 at a location upstream of the residual gas analyzer 150 and the cryogenic pump 132. The valve 155 may be any suitable type of valve. In some embodiments, the valve 155 may be a vacuum type gate valve. The valve 155 may be configured to open and close to allow and disallow fluid communication between the conduit 145, the residual gas analyzer 150 and the cryogenic pump 132 with the pump manifold 139.

The turbo pump 131 and the first roughing pump 133 may be fluidly coupled with the pump manifold 139 through a conduit 160. The conduit 160 may include one or more flexible pipes. A valve 165 may be disposed in, along, or fluidly coupled to the conduit 160. The valve 165 may be any suitable type of valve. In some embodiments, the valve 165 may be a right-angle vacuum valve. The open and close of the valve 165 may allow and disallow the fluid coupling between the conduit 160 and the pump manifold 139.

As shown in FIG. 2A, the pump manifold 139 may be fluidly coupled to the vacuum manifold 125 through the conduit 135. The valve 142 may be configured to control the fluid communication between the vacuum manifold 125 and the pump manifold 139. A valve 170 may be disposed in or along, or fluidly coupled to the vacuum manifold 125. As shown in FIG. 2A, the valve 170 may be disposed between a conduit 171 and the vacuum manifold 125. Open and close of the valve 170 controls the fluid coupling between the conduit 171 and the vacuum manifold 125, and hence the fluid coupling between the conduit 171 and the tank 110. A plurality of devices may be disposed in or along, or fluidly coupled to the conduit 171. For example, as shown in FIG. 2A, a pressure gauge (or pressure sensor) 175 and a temperature sensor 176 may be fluidly coupled to the conduit 171. The pressure gauge 175 may be configured to measure a pressure within the conduit 171. Any suitable pressure gauge 175 may be used. For example, the pressure gauge 175 may be an analog pressure gauge or a digital pressure gauge. In some embodiments, the pressure gauge 175 may have a measuring range of 0 to 30 psi (or 0 to 206843 Pa). The temperature sensor 176 may be configured to measure a temperature within the conduit 171. Any suitable temperature sensor 176 may be used. For example, in some embodiments, the temperature sensor 176 may be a thermocouple. Signals from the temperature sensor 176 may be used for controlling the temperature of a purge gas within the conduit 171 during a vacuum acquisition process.

As shown in FIG. 2A, a conduit 178 may fluidly couple the conduit 171 and the tank 110 disposed inside the oven 105. A valve 180 may be disposed in, along, or fluidly coupled to the conduit 178. The conduit 178 may be fluidly coupled with a gas supply line or conduit 181. The gas supply line 181 may be fluidly coupled to the conduit 178 at a location closer to the tank 110 than the valve 180. The gas supply line 181 may include a tank 182 configured to store a liquid gas, such as nitrogen. Other suitable gases may also be used. The gas supply line 181 may also include a vaporizer 183 disposed downstream of the tank 182. The vaporizer 183 may be configured to turn the liquid nitrogen gas from the tank 182 into gaseous form. In some embodiments, the vaporizer 183 may include a heater configured to raise the temperature of the liquid nitrogen gas such that the liquid nitrogen gas is vaporized. The gas supply line 181 may further include a valve 184 disposed downstream of the vaporizer 183 and configured to control the flow the gas to the tank 110. In some embodiments, additional heaters may be disposed in the conduit 181, e.g., downstream of vaporizer 183 to heat the nitrogen gas. The nitrogen gas may be supplied to the tank 110 to heat up the pressure vessel 112 before turning on other components, such as the roughing pumps 133 and/or 134 of the vacuum acquisition system.

As shown in FIG. 2A, the conduit 171 may be fluidly coupled with a conduit 185. The conduit 185 may be fluidly coupled with the inner pressure vessel 112 of the tank 110 such that the hot gas inside the pressure vessel 112 may be vented outside of the tank 110 during the vacuum acquisition process. The arrow 188 indicates that hot gas from the pressure vessel 112 may flow into the conduit 185. Various devices may be disposed in, along, or fluidly coupled to the conduit 185. For example, a valve 190 may be disposed in the conduit 185. A pressure gauge 192 may be fluidly coupled to the conduit 185. In some embodiments, the pressure gauge 192 may be a pressure transducer that outputs a high level of voltage (e.g., 0.5 Volt to 5 Volt) or frequency (e.g., 1000 Hz to 6000 Hz) as an indicator of a pressure. In the embodiment shown in FIG. 2A, the pressure gauge 192 is disposed upstream of the valve 190. Other locations are also contemplated for the pressure gauge 192, such as downstream of the valve 190.

As shown in FIG. 2A, the conduit 185 may be fluidly coupled with a conduit 195, which may be further fluidly coupled with two conduits 196 and 197. The conduits 196 and 197 may each vent to the atmosphere. A valve 198 may be disposed in, along, or fluidly coupled to the conduit 196. The valve 198 may be configured to control venting of the gas to the atmosphere during the vacuum acquisition process. A valve 186 may be disposed in, along, or fluidly coupled to the conduit 196. The valve 186 may be a check valve. A valve 187 may be disposed in, along, or fluidly coupled to the conduit 196. The valve 187 may be a throttling needle valve. The valve 187 may be disposed downstream of the valve 186, which may be disposed downstream of the valve 198.

The conduit 197 may include a valve 199. The valve 199 may control the venting of gas from the annular space 113 of the tank 110. A valve 189 may be disposed in, along, or fluidly coupled to the conduit 197. The valve 189 may be a check valve. The valve 189 may be disposed downstream of the valve 199.

Components included in the system 100 other than the oven 105 and the tank 110 may be collectively referred to as a vacuum pumping subsystem 250.

Figure 2B:
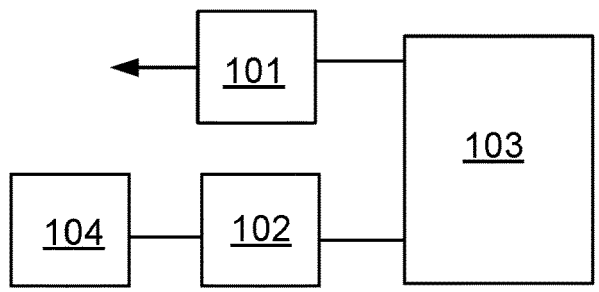
FIG. 2B schematically illustrates control components of the system that may be configured to control one or more of the components shown in FIG. 2A, in accordance with the present disclosure.

FIG. 2B schematically illustrates exemplary control components of the system 100 that may be configured to control one or more of the components shown in FIG. 2A. The system 100 may include a controller 101. The controller 101 may include hardware components and software components. For example, the controller 101 may include a hardware processor or processing circuit. The controller 101 may be encoded with computer codes that are configured to control various devices (e.g., valves and pumps) shown in FIG. 2A. Any suitable processor may be included in the controller 101.

The system 100 may also include a residual gas controller 102 configured to control the residual gas within the system 100. In some embodiments, the residual gas controller 102 may be integrated with the controller 101, and may not be separately provided. The system 100 may include a memory 103 configured to store various data or signals received from the devices shown in FIG. 2A. For example, the memory 103 may be configured to store pressure data, temperature data, pump operating data, predetermined vacuum levels, predetermined time periods, predetermined threshold values, etc. The memory 103 may also be configured to store computer codes or instructions, which may be executable by the processor included in the controller 101. Any suitable memory 103 may be used, such as a dynamic random-access memory (DRAM), a static random-access memory (SRAM), or a read only memory (ROM), a flash memory, etc. The controller 101 and the residual gas controller 102 may access the memory 103 to read data from the memory 103 or write data to the memory 103.

The system 100 may further include a power supply 104 configured to provide power the residual gas controller 102, the memory 103, and the controller 101. The power supply 104 may provide power to other devices included in the system 100, such as pumps, valves, sensors, etc.

Figure 3:
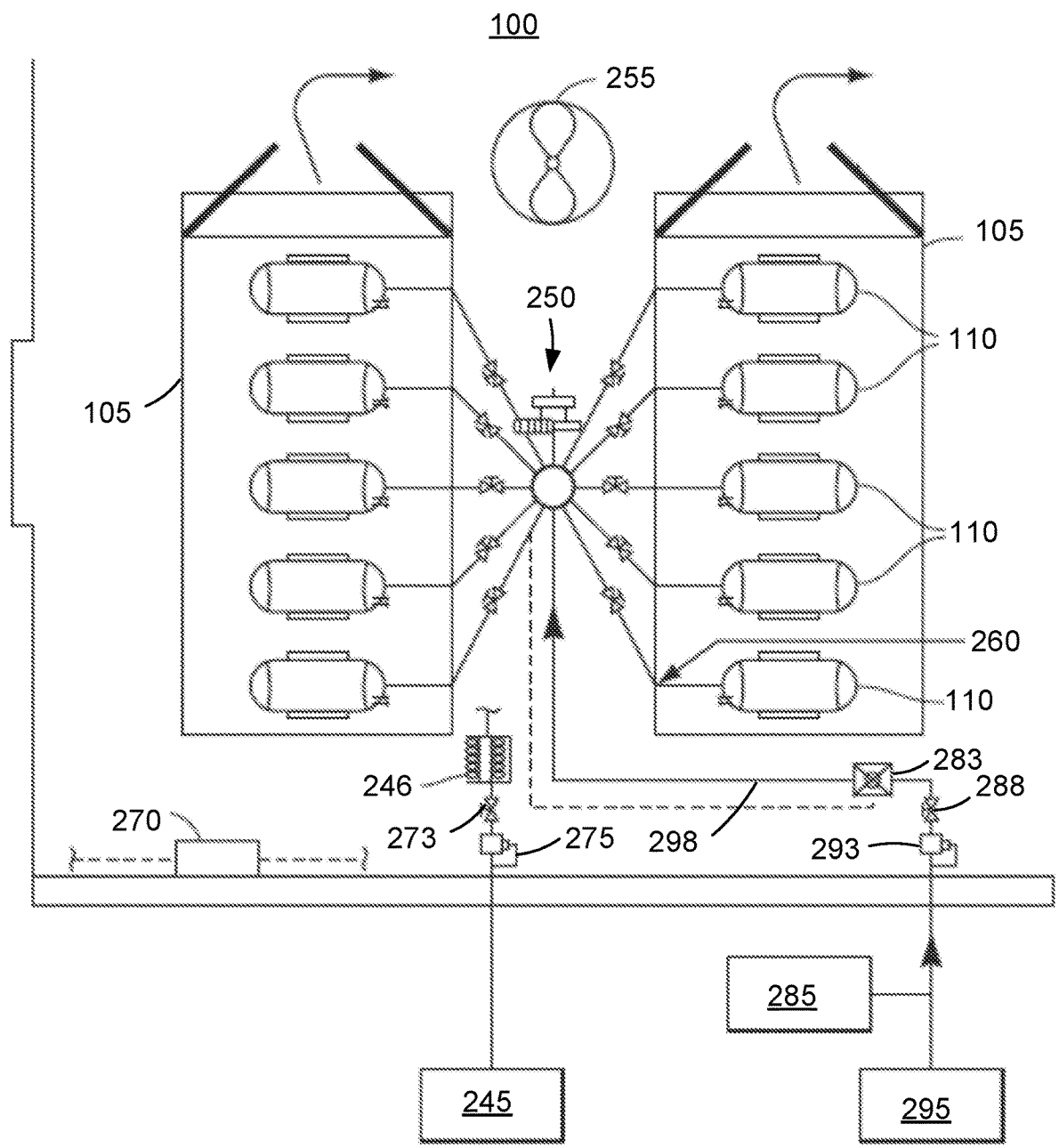
FIG. 3 schematically illustrates the system that includes more than one oven with each oven having more than one tank disposed therein, in accordance with the present disclosure.

FIG. 3 schematically illustrates the system 100 that includes more than one oven 105 with each oven 105 having more than one tank 110. Thus, system 100 shown in FIG. 3 can simultaneously process multiple tanks 110 to achieve a vacuum level that is on the order of $1\times10^{-6}$ torr in the annular spaces 113 of each tank 110 using a manifolded configuration. In some embodiments, the system 100 shown in FIG. 3 may simultaneously process ten 50-gallon LNG fuel tanks 110 within a 48-hour time period to achieve the $1\times10^{-6}$ torr vacuum level in the annular spaces 113.

As shown in FIG. 3, the system 100 includes two ovens 105. Any other suitable number of ovens 105 may be included in the system 100. Each oven 105 includes five tanks 110. Any other suitable number of tanks 110 may be included in each oven 105. In some embodiments, each tank 110 may have a volume of 50 gallons (or 0.19 cubic meters). Each tank 110 may be fluidly coupled to the vacuum pumping subsystem 250, which includes various pumps, valves, and other devices shown in FIG. 2A, such as the turbo pump 131, the first and second roughing pumps 133 and 134, the cryogenic pump 132, the residual gas analyzer 150, and the vacuum gauge 130, etc.

As shown in FIG. 3, the system 100 may include a fan 255 configured to exhaust air or gas from the ovens 105. Each oven 105 may include multiple holes 260 configured to allow conduits (e.g., pipes) to connect the tanks 110 inside the oven 105 with the vacuum pumping subsystem 250 outside of the oven 105. The system 100 may include a power supply 270 configured to supply power to various devices in the system 100. The system 100 also includes a gas source 245 and a heater 246. The gas source 245 may be configured to supply a gas (e.g., a nitrogen gas) to the oven 105 and/or the tanks 110 during a vacuum acquisition process. The system 100 may include a check valve 273 and a pressure regulator 275 disposed between the gas source 245 and the heater 246. In some embodiments, one heater 246 may be provided outside of the ovens 105 to heat the nitrogen gas from the gas source 245, as shown in FIG. 3. The hot nitrogen gas supplied into the ovens 105 may maintain the temperature inside the ovens 105 in a predetermined range, such as, for example, 180° F. to 200° F. In some embodiments, the gas source 245 may represent a vaporizer or a portion of a conduit from which gaseous nitrogen may be supplied. In some embodiments, additional heaters may be disposed within the oven 105 to heat up air and/or gas within the oven 105.

FIG. 3 further shows a cold trap 285 configured to condense and trap vapor, gas, moisture, etc. during a vacuum acquisition process. For example, the cold trap 285 may be a liquid nitrogen cold trap configured to trap liquid nitrogen (for illustrative purposes, the cold trap 285 may be referred to as the liquid nitrogen cold trap 285). A liquid nitrogen tank 295 may be included in the system 100 to supply nitrogen gas to the vacuum pumping subsystem 250 through a conduit 298 during a vacuum acquisition process. In some embodiments, the liquid nitrogen tank 295 may have a storage volume of 3000 gallons (or 11.36 cubic meters). Various devices may be disposed in, along, or fluidly coupled to the conduit 298. For example, the conduit 298 may be fluidly coupled to a solenoid valve 283, a check valve 288, and a pressure regulator 293. A portion of the liquid nitrogen from the liquid nitrogen tank 295 may be directed to the cold trap 285, as shown in FIG. 3.

Figure 4:
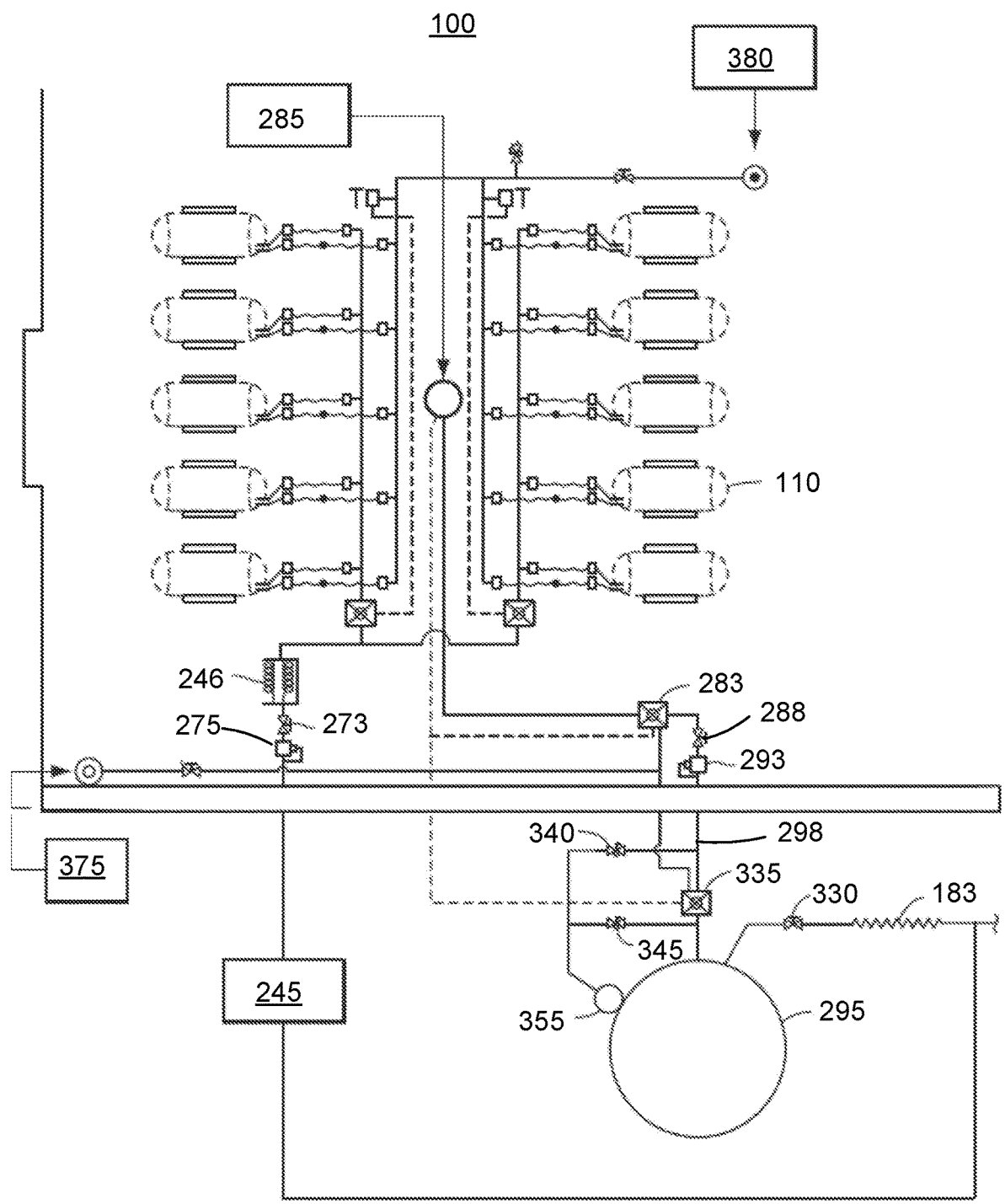
FIG. 4 schematically illustrates the system shown in FIG. 3 with additional details, in accordance with the present disclosure.

FIG. 4 schematically illustrates the system 100 shown in FIG. 3 with additional details. The system 100 shown in FIG. 4 may be configured to control liquid refill of the liquid nitrogen cold trap 285 by opening and closing the solenoid valve 283. As shown in FIG. 4, the system 100 may include the vaporizer 183 configured to turn the liquid nitrogen gas from the liquid nitrogen tank 295 into gaseous form. The nitrogen gas output from the vaporizer 183 may be supplied as the nitrogen gas source 245 (also shown in FIG. 3) to the oven 105 and/or the tanks 110 disposed therein.

As shown in FIG. 4, the system 100 may include a first relief valve 340 and a second relief valve 345 fluidly coupled with a vent stack 355. In some embodiments, the vent stack 355 may be provided on the liquid nitrogen tank 295. Both the first relief valve 340 and the second relief valve 345 may be fluidly coupled with the conduit 298. The first relief valve 340 may be fluidly coupled to the conduit 298 downstream of the solenoid valve 335, and the second relief valve 345 may be fluidly coupled to the conduit 298 upstream of the solenoid valve 335. The solenoid valve 335 may be disposed between the liquid nitrogen tank 295 and the pressure regulator 293. The solenoid valve 335 may be fluidly coupled with the solenoid valve 283. Both solenoid valves 283 and 335 may be fluidly coupled with a helium source 375, which may provide helium for actuating the pneumatic solenoid valves 283 and 335.

The system 100 shown in FIG. 4 may include the liquid nitrogen cold trap 285 configured to trap nitrogen gas by condensing it into liquid form. The system 100 may also include a vent 380 for venting gaseous nitrogen from the tanks 110.

Figure 5A:
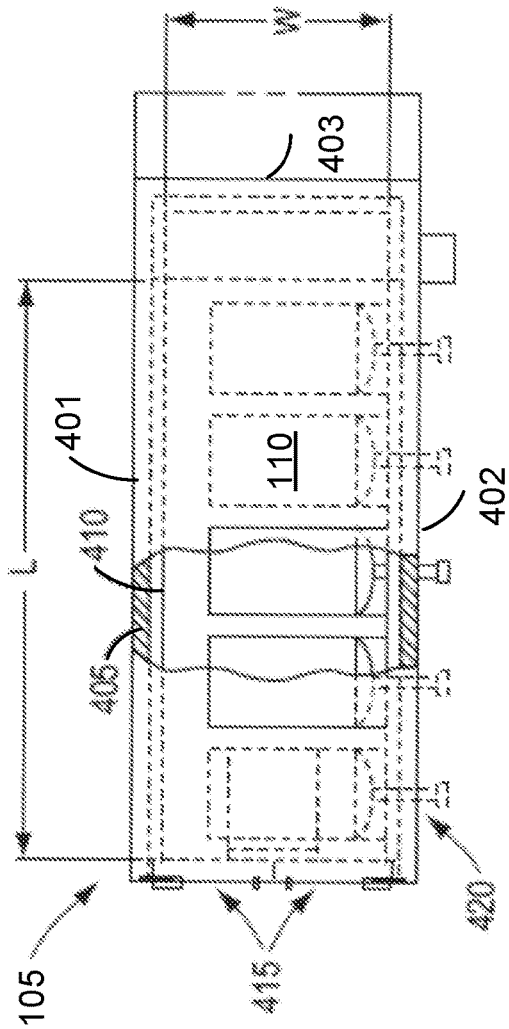
FIG. 5A schematically shows a top view of an oven including a plurality of tanks disposed therein, in accordance with the present disclosure.
Figure 5C:
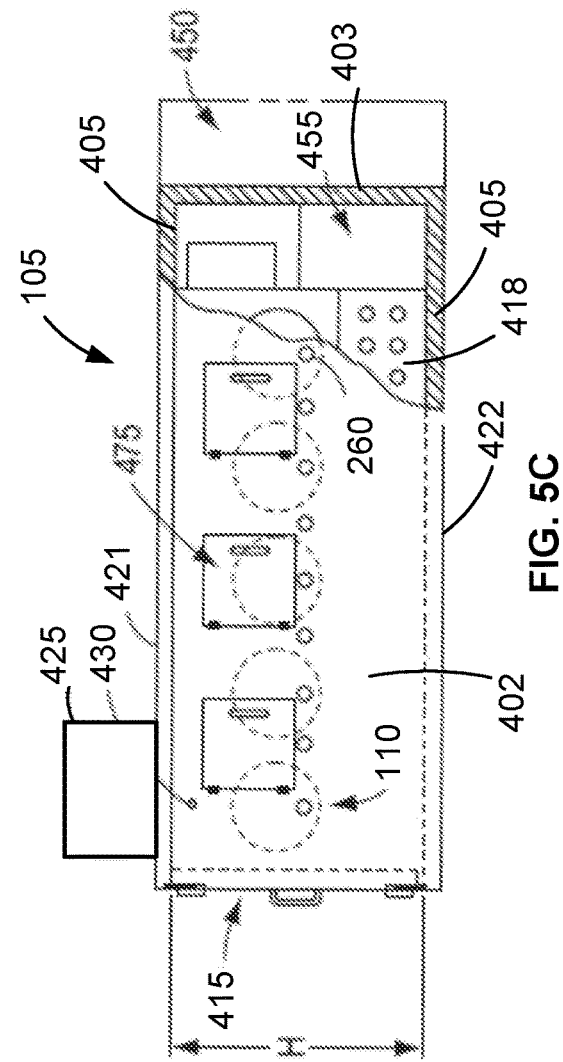
FIG. 5C shows a front view of the oven, in accordance with the present disclosure.
Figure 5B:
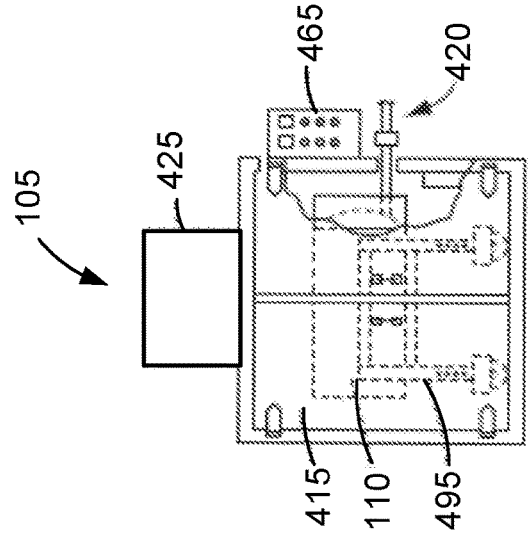
FIG. 5B schematically shows a side view of the oven, in accordance with the present disclosure.

FIG. 5A schematically shows a top view of the oven 105 including a plurality of tanks 110. FIG. 5B schematically shows a side view of the oven 105. FIG. 5C shows a front view of the oven 105.

As shown in FIG. 5A, the oven 105 may have a cubic shape. The oven 105 may include an insulation 405 installed to at least one wall, such as the longitudinal side wall 401. In some embodiments, both longitudinal side walls 401 and 402 may have insulation 405 installed thereto. In some embodiments, a rear side wall 403 may also include insulation 405 installed thereto. It is understood that insulation 405 may also installed to a door 415, a ceiling 421 (shown in FIG. 5B) of the oven 105 and a floor 422 (shown in FIG. 5B) of the oven 105. Air diffusers may be installed within the space indicated by reference numeral 410. The inner space defined by the oven 105 may include an unobstructed length L. In some embodiments, the unobstructed length L may be 13 feet (or 3.96 meters), or any other suitable size. The inner space defined by the oven 105 may also have an unobstructed width W. In some embodiments, the unobstructed width W may be 5 feet (or 1.52 meters), or any other suitable size. The inner space having the unobstructed length L and the unobstructed width W may be sufficient to accommodate five tanks 110, as shown in FIG. 5A.

The oven 105 shown in FIG. 5A includes the door 415. In some embodiments, the oven 105 may include two or more doors 415. Each tank 110 may be connected to a pipe 420 for connecting to the vacuum pumping subsystem 250 (shown in FIG. 3). In some embodiments, the pipe 420 may be an embodiment of conduit 115 shown in FIG. 2A. In some embodiments, the pipe 420 may be a part of the conduit 115. In some embodiments, the pipe 420 may be a separate pipe fluidly coupled to the conduit 115.

As shown in the side view shown in FIG. 5B, the oven 105 may include side access doors 475 configured to provide access to the inside of the oven 105. The access doors 475 may facilitate vacuum line hook up to tanks 110 and turning vacuum valves off outside the hot oven 105 after vacuum acquisition processes are complete. The access doors 475 may also provide access for connecting the heating hoses for supplying hot nitrogen gas to the pressure vessels 112 of the tanks 110. Although three side access doors 475 are shown, the oven 105 may include any suitable number of side doors, such as one, two, four, five, six, etc. The oven 105 may include an exhauster envelope or housing 425 configured to house an exhaust fan, such as the fan 255 shown in FIG. 3. The exhauster fan may accelerate cooldown of the oven 105 for plumbing disconnect and removal of the tanks 110. The oven 105 may include one or more venting holes 430 for venting gaseous nitrogen from the oven 105 and/or the tanks 110.

FIG. 5B shows that the ceiling 421, the rear side wall 403, and the floor 422 of the oven 105 all have insulation 405 installed thereto. In some embodiments, the door 415 may also include the insulation 405 installed thereto. The oven 105 may include a housing 450 configured to accommodate a blower and other heating equipment. The system 100 may also include heating ducts installed in a space 455.

FIG. 5B also shows an air diffuser 418 installed around at least side walls 401 and 402. In some embodiments, the air diffuser 418 may be installed at a suitable place where insulation 405 is installed. A suitable size of the air diffuser 418 may be selected. In some embodiments, the size of the air diffuser 418 may be selected such that it does not cover the entire height of the wall (e.g., side wall 402) to which insulation 405 is installed. The oven 105 may also include holes 260 (also schematically shown in FIG. 3) for allowing pipes and other conduits to connect the tanks 110 disposed inside the oven 105 and the vacuum pumping subsystem 250 (shown in FIG. 3) disposed outside of the oven 105. In some embodiments, the oven 105 may have an unobstructed working height H of 5 feet (or 1.52 meters). Other suitable heights are also contemplated.

FIG. 5C is a front view of the oven 105. As shown in FIG. 5C, the oven 105 may include an oven control panel 465 configured with various controllers, switches, buttons, etc., for controlling the operations of the oven 105. The oven control panel 465 may be installed to an outer wall of the oven 105. The tank 110 may be placed on a cart 495. The cart 495 may have wheels, and hence may be movable. In some embodiments, the cart 495 may be height adjustable, such that the elevation height of the tank 110 above the floor of the oven 105 may be adjusted to allow vacuum port alignment with the vacuum pumping subsystem 250.

Figure 6:
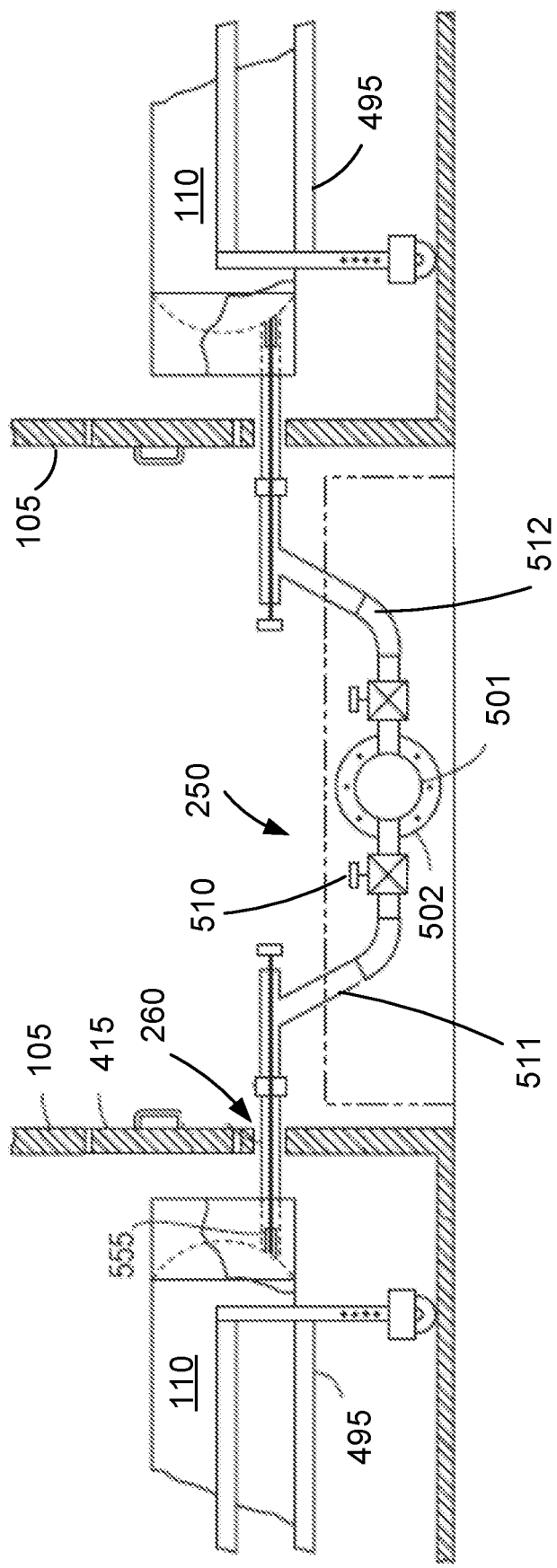
FIG. 6 schematically illustrates a vacuum pumping subsystem fluidly coupled with two ovens, in accordance with the present disclosure.

FIG. 6 schematically illustrates the vacuum pumping subsystem 250 fluidly coupled with two ovens 105. The vacuum pumping subsystem 250 is simplified for illustrative purposes. Representative components, such as a vacuum manifold 501 and a cryogenic pump 502 are shown for the vacuum pumping subsystem 250. The vacuum manifold 501 may represent the vacuum manifold 125 shown in FIG. 2A. The cryogenic pump 502 may represent the cryogenic pump 132 shown in FIG. 2A. It is understood that the vacuum pumping subsystem 250 may include various other devices and components shown in FIG. 2A.

Each oven 105 shown in FIG. 6 may include a plurality of tanks 110 (e.g., 5 tanks), as shown in FIGS. 4 and 5, although only one tank is shown in this view. The vacuum pumping subsystem 250 may provide vacuum pumping for the tanks 110 in the left oven 105 through a first set of vacuum pump piping 511, and for the tanks 110 in the right oven 105 through a second set of vacuum pump piping 512. The first set of vacuum pump piping 511 may have the same configuration as the second set of vacuum pump piping 512. Therefore, only the first set of vacuum pump piping 511 is described below.

As shown in FIG. 6, the first set of vacuum pump piping 511 may include a valve 510 configured to control the fluid communication between the tanks 110 and the vacuum pumping subsystem 250. The valve 510 may be any suitable control valve. For example, the valve 510 may be a pneumatic valve. The first set of vacuum pump piping 511 may be coupled with the tanks 110 through the holes 260 provided on a wall of the oven 105. Each tank 110 may include a tank vacuum valve 555 configured to couple with the first set of vacuum pump piping 511.

Figure 7:
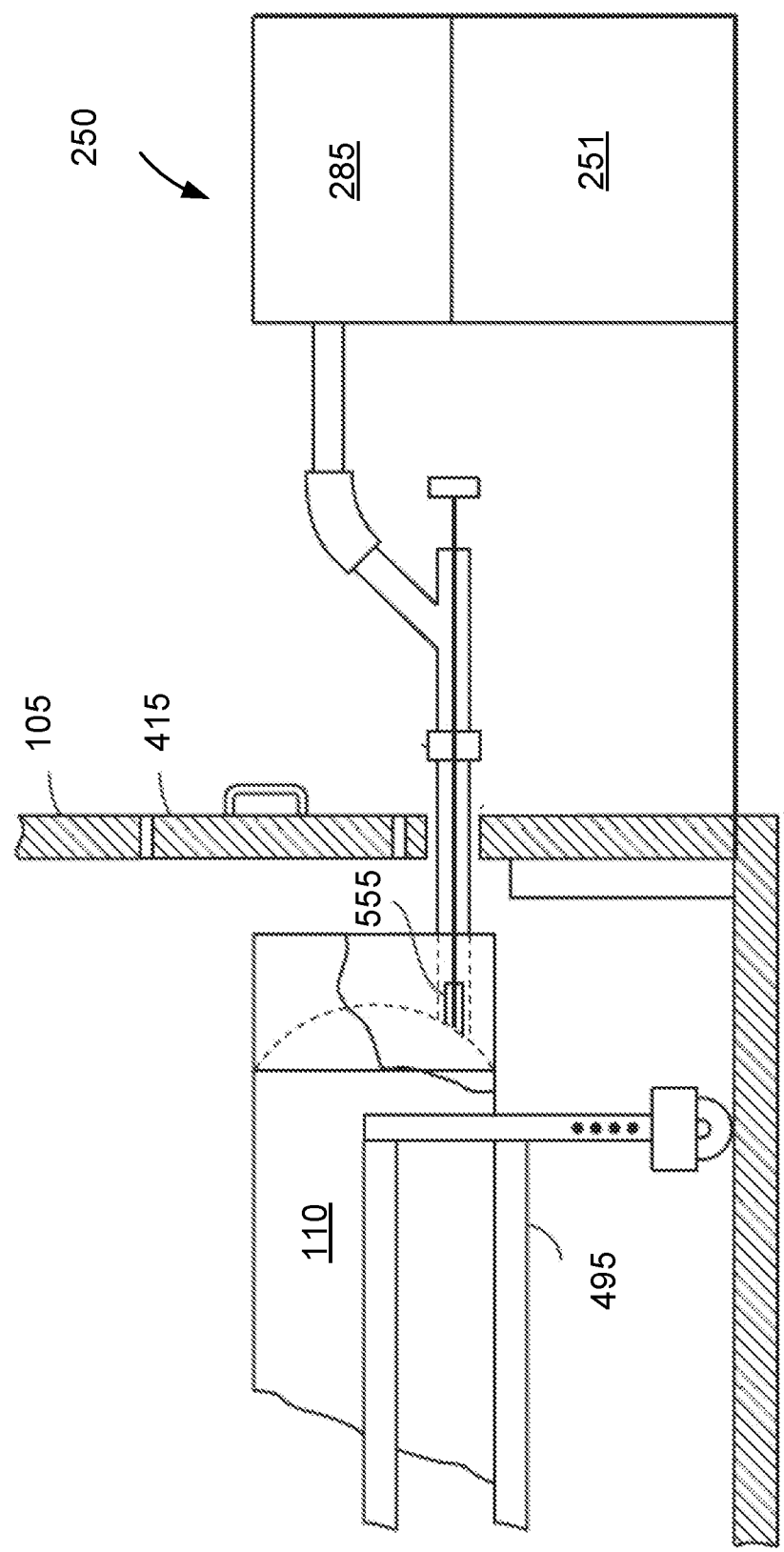
FIG. 7 schematically illustrates additional details of the vacuum pumping subsystem, in accordance with the present disclosure.

FIG. 7 schematically illustrates additional details of the exemplary vacuum pumping subsystem 250. As shown in FIG. 7, the vacuum pumping subsystem 250 includes the liquid nitrogen cold trap 285 (also shown in FIGS. 3 and 4) configured to trap liquid nitrogen during the vacuum acquisition process. Other components and devices of the vacuum pumping subsystem 250 are represented by reference numeral 251 for illustrative purposes.

Figure 8:
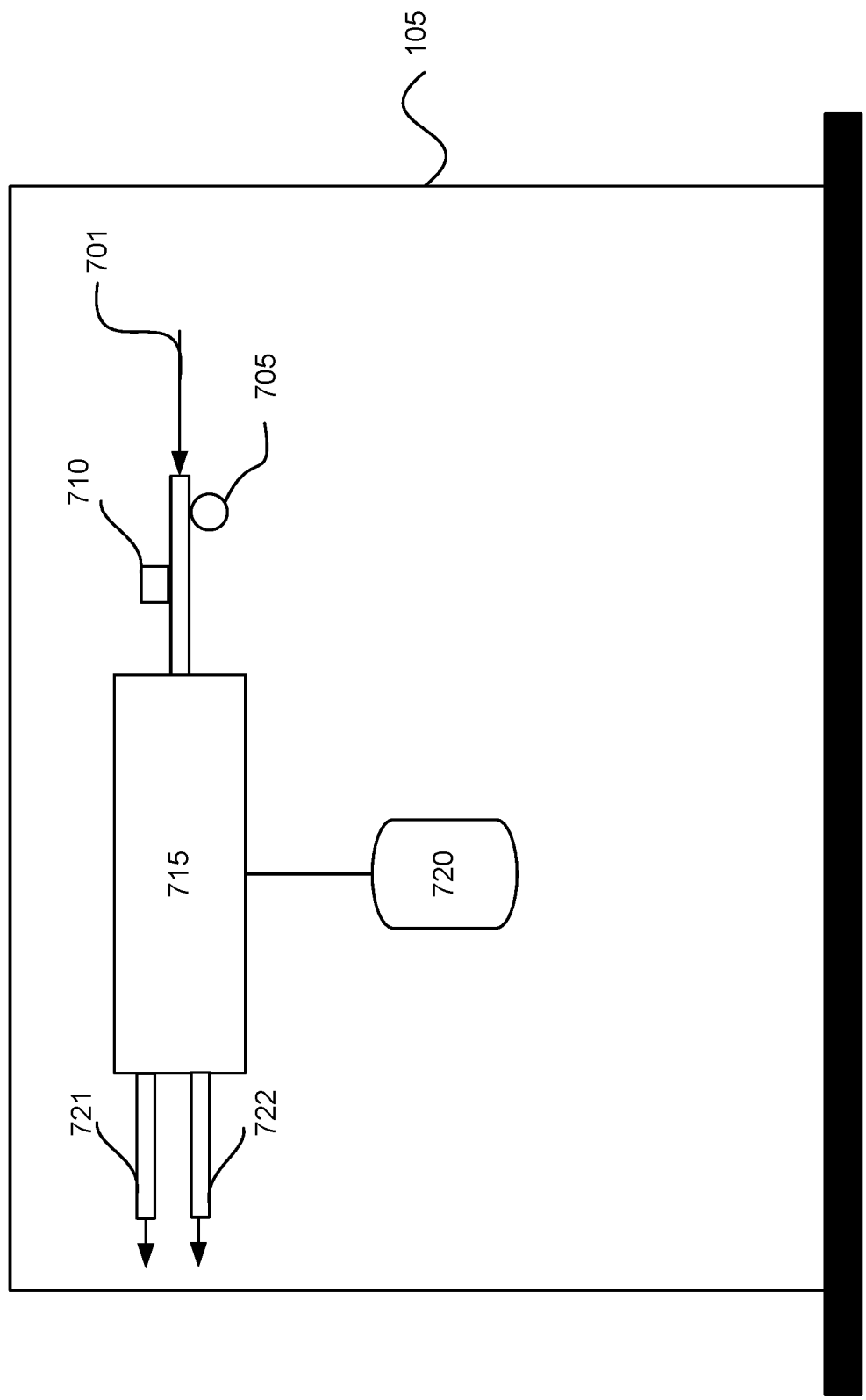
FIG. 8 schematically illustrates a heater for heating gaseous nitrogen supplied into the oven and/or the tanks disposed inside the oven, in accordance with the present disclosure.

FIG. 8 schematically illustrates an exemplary heater 715 for heating the gaseous nitrogen supplied into the oven 105 and/or the tanks 110. The heater 715 may be disposed inside or outside the oven 105. In some embodiments, the heater 715 may be installed on an outside wall of the oven 105. Gaseous nitrogen may be supplied from a source to a conduit as indicated by reference numeral 701. The gaseous nitrogen may flow through an in-line filter (or water trap) 705 configured to trap water in the gaseous nitrogen flow, and a solenoid valve 710, prior to reaching the heater 715. The heater 715 may be controlled by a heater controller 720. The heater controller 720 may include various hardware and/or software components, and may be configured to control the temperature of the heater 715. The heater 715 may heat up the gaseous nitrogen to a predetermined temperature or a temperature within a predetermined range, such as 180° F. to 200° F. The heated nitrogen gas may be supplied to the inside space of the oven 105 through conduits 721 and 722. The hot nitrogen gas may also be supplied into the tanks 110 as a purge gas through one or more of the conduits 721 and 722. In some embodiments, the system 100 may include a separate heater (other than heater 715) for heating the nitrogen gas that is supplied to the tanks 110.

In some embodiments, the nitrogen gas may be heated up to 250° F. via the heater 715. The hot nitrogen gas may be supplied to both the oven 105 and the tanks 110. In some embodiments, temperature sensors may be located at the oven 105. When the gas temperature measured by the temperature sensors reaches a predetermined temperature (e.g., 250° F.), vacuum pumping may be automatically started. In some embodiments, during the tank vacuum pump-down, the oven 105 may maintain a constant temperature and the oven 105 may be configured to maintain a uniform temperature around the entire surface of each tank 110. In some embodiments, the temperature range within the oven may be programmed and controlled to be between 200 and 450° F. For example, the constant temperature may be set at 200° F., and the temperature around the entire surface of each tank 110 may be maintained to be 200±3° F. or 200±5° F. The variation range 3° F. or 5° F. may be replaced by any other suitable value, such as 2° F., 4° F., or 1° F. In some embodiments, the constant temperature may be set as 250° F., and the temperature may be controlled at 250±3° F. or 250±5° F.

Figure 9:
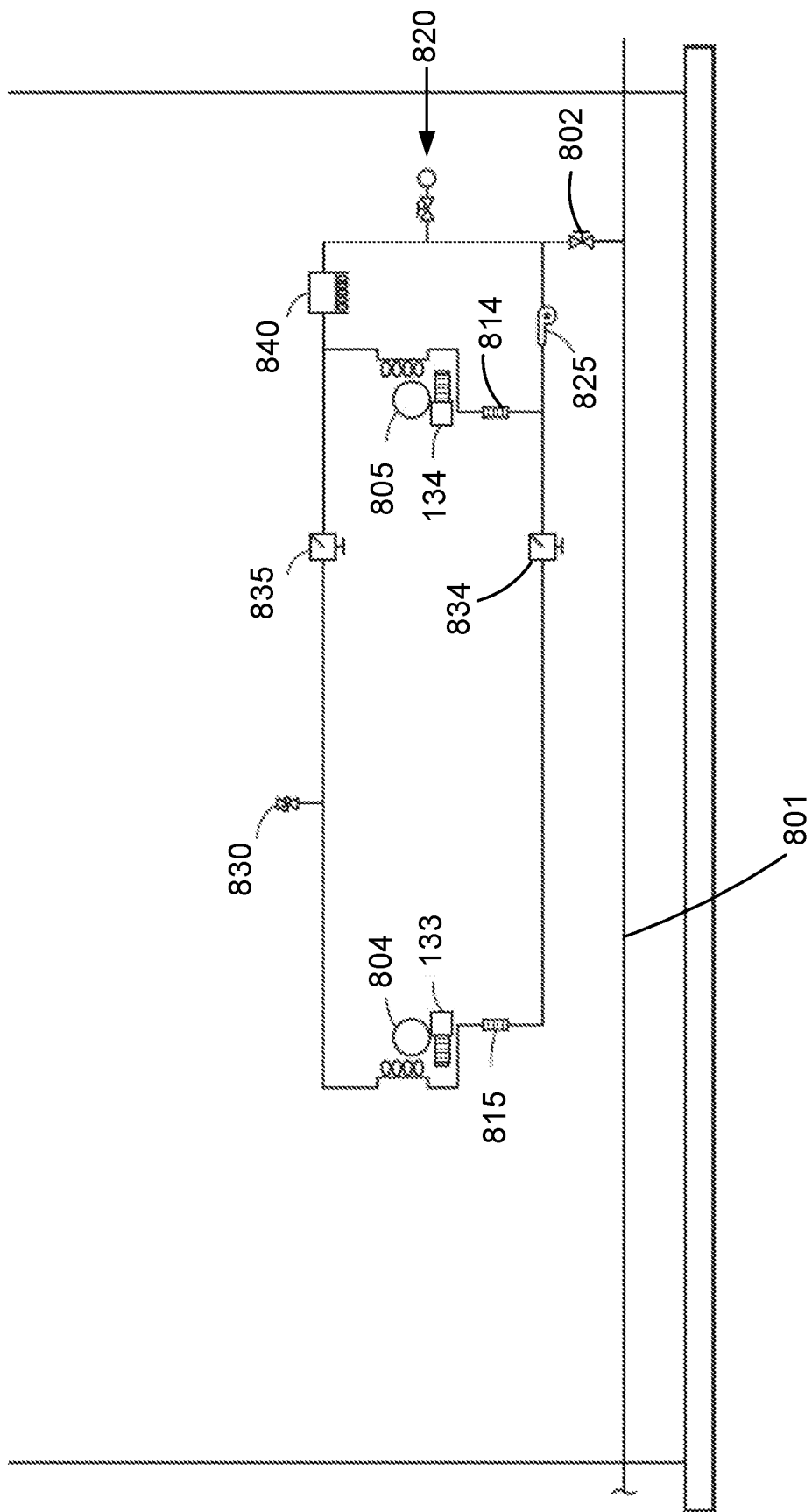
FIG. 9 schematically illustrates a water coolant flow loop for first and second vacuum diffusion pumps, in accordance with the present disclosure.

FIG. 9 schematically illustrates an exemplary water coolant flow loop for first and second vacuum diffusion pumps 804 and 805. The vacuum diffusion pumps 804 and 805 may be disposed adjacent first and second roughing pumps 133 and 134, respectively. The water coolant flow loop may include a water supply line 801 to supply water and a valve 802 that controls the water supply in the water coolant flow loop. The water coolant flow loop may also include a circulator 825 configured to facilitate the circulation of the water. The circulator 825 may include a suitable pump. The water coolant flow loop may include first and second flow meters 814 and 815, a relief valve 830, and first and second balancing valves 834 and 835. The water coolant flow loop may include a cooler 840 configured to cool the water in the loop. The water coolant flow loop may further include a pH reservoir water check point 820. The pH level of the water may be controlled in a range of 7.5-8.0.

An example operation process of the vacuum acquisition system 100 shown in FIGS. 2A and 2B, as well as other components shown in FIGS. 3-9, is described below. The vacuum acquisition system 100 is configured to establish a target vacuum level on the order of $1\times10^{-6}$ torr or less within the annular space 113 of the tank 110. This vacuum level, once established, may be maintained by activated charcoal materials and silver zeolite gettering materials installed in a central beam of the tank 110 and within the annular space 113 of the tank 110. Various system components are configured to provide a fully integrated, reliable, high speed, vacuum pumping capability, combined with cyclic hot gas purging of the annular space 113 of the tank 110 and acoustical induced vibration (as generated by the acoustic source 120 shown in FIG. 2A) to establish high quality vacuum levels in the annular space 113 of the tank 110. System operations may be fully or partially automated and computer controlled.

First, the roughing pumps 133 and 134 are manually set up. The tank(s) 110 is placed in the oven 105 equipped with in-line gaseous nitrogen heaters (e.g., the heater 715 shown in FIG. 8) and a re-circulating fan blower (e.g., the fan 255 shown in FIG. 3) to maintain the air temperature between +180° F. to +200° F. inside the oven 105. Then, the hot gaseous nitrogen supply line 181 may be connected to a vent outlet fitting (not shown) of the tank 110 and the valve 180, which may be a control valve. A fill inlet (not shown) of the tank 110 may be connected via the conduit 185 (which may be a flex line) to the valve 190, which may be a control valve. Through the gaseous nitrogen supply line 181 and the conduit 185, the valve 190, and the valve 198, nitrogen gas may be supplied to and vented from the tank 110 that includes the inner pressure vessel 112 and the annular space 113. The conduit 115 of the vacuum pumping subsystem 250 may be connected to a vacuum port pump-out valve provided on the tank 110, such as, for example, the tank vacuum valve 555 shown in FIG. 6.

Next, the controller 101 may control the system 100 to perform a rough pump cycle and a purge cycle (collectively the rough-purge cycle or purge-rough cycle) one or more times (i.e., repeatedly) until a first predetermined vacuum level is reached inside the annular space 113 of the tank 110. Table 1 shows example settings of the control valves and other devices during an initial rough pump cycle.

TABLE 1

Initial Rough Pump Cycle Control Valve Settings

| Device | Status | Controls |
| --- | --- | --- |
| Nitrogen Gas Heaters (e.g., heater 715) | On | Hot nitrogen gas supply at 180° F. to 200° F. |
| Valve 155 | Closed | Control access to the vacuum manifold 125 from the cryogenic pump 132 |
| Valve 199 | Closed | Control venting of gas within the annular space 113 to the atmosphere |
| Valve 190 | Closed | Control purge gas to annular space 113 |
| Valve 170 | Open | Control purge gas to and from the annular space 113 |
| Valve 156 | Open | Control access to vacuum manifold 125 from second roughing pump 134 |
| Valve 165 | Closed | Control access to the vacuum manifold 125 from the turbo pump 131 |
| Valve 198 | Open | Vent gas control |
| Valve 142 | Open | Vacuum manifold isolation control |
| Valve 180 | Closed | Hot nitrogen gas supply control |

The controller 101 may control the open and close status of the various control valves. The controller 101 may also control the operations of the various pumps in the system 100. The controller 101 may operate the system 100 to perform an initial pump-down during a rough pump cycle. For example, the controller 101 may operate the second roughing pump 134 to pump air and/or gas out of the annular space 113 of the tank 110, and vent the air and/or gas to the atmosphere through the valves 170 and 198. The initial pump-down may take a first predetermined time period. The first predetermined time period may be any suitable time period. In one embodiment, the first predetermined time period is ten (10) minutes. In some embodiments, the first predetermined time period may be 15 minutes, 20 minutes, 30 minutes, etc.

During the initial pump-down, the controller 101 may receive sensor signals from various sensors and gauges included in the system 100. For example, the controller 101 may receive signals from the vacuum gauge 130. The signals received from the vacuum gauge 130 indicate the vacuum level within the vacuum manifold 125. Because the tank 110 including the annular space 113 is in fluid communication with the vacuum manifold 125, the vacuum level measured by the vacuum gauge 130 also indicate the vacuum level within the annular space 113 of the tank 110.

When the signals from the vacuum gauge 130 indicate a first predetermined vacuum level has been reached within the first predetermined time period after the startup of the initial pump-down, the controller 101 may close valve 156 and perform a purge cycle, which is discussed below. In the present disclosure, when referring to a predetermined vacuum level has been reached, it means that the measured vacuum level is within a predetermined tolerance or error about the predetermined vacuum level. For example, when the predetermined vacuum level is $1\times10^{-3}$ torr, and the predetermined tolerance or error range is $-0.5\times10^{-3}$ torr to $+0.5\times10^{-3}$ torr, then when the measured vacuum level is between $0.5\times10^{-3}$ torr and $1.5\times10^{-3}$ torr, the predetermined vacuum level is reached. The first predetermined vacuum level may be any suitable vacuum level. In some embodiments, the first predetermined vacuum level may be $1\times10^{-3}$ torr.

Example control valve settings for the purge cycle are shown in Table 2.

TABLE 2

Purge Cycle Control Valve Settings

| Device | Status | Controls |
|---|---|---|
| Nitrogen Gas Heaters (e.g., heater 715) | On | Hot nitrogen gas supply at 180° F. to 200° F. |
| Valve 155 | Closed | Control access to the vacuum manifold 125 from the cryogenic pump 132 |
| Valve 199 | Closed | Control venting of gas within the annular space 113 to the atmosphere |
| Valve 190 | Open | Control purge gas to annular space 113 |
| Valve 170 | Open | Control purge gas to and from the annular space 113 |
| Valve 156 | Closed | Control access to vacuum manifold 125 from second roughing pump 134 |
| Valve 165 | Closed | Control access to the vacuum manifold 125 from the turbo pump 131 |
| Valve 198 | Closed | Vent gas control |
| Valve 142 | Closed | Vacuum manifold isolation control |
| Valve 180 | Open | Hot nitrogen gas supply control |

During a purge cycle, the controller 101 may open the valve 190 and the valve 180 or keep the valves 180 and 190 in open states while hot nitrogen gas is supplied into the tank 110 that includes the pressure vessel 112 and the annular space 113, until the pressure gauge 175 indicates a first predetermined pressure has been reached (e.g., the pressure measured by the pressure gauge 175 is within a predetermined tolerance of the first predetermined pressure, or is greater than or equal to the first predetermined pressure). The first predetermined pressure may be any suitable value, e.g., 5 psig (or 34473.79 Pa). The predetermined tolerance may be in a range of −0.5 psig (or −3447.38 Pa) to +0.5 psig (or +3447.38 Pa). The pressure measured by the pressure gauge 175 may indicate the pressure inside the annular space 113 of the tank 110. The controller 101 may close the valves 180 and 190 and maintain the first predetermined pressure within the annular space 113 of the tank 110 for a preset period of time. The preset period of time may be any suitable value, for example, 1 minute, 2 minutes, etc. The controller 101 may open valves 170 and 199 such that the nitrogen gas is vented out of the tank 110 and to the atmosphere through the valve 199, until the pressure gauge 175 indicates a second predetermined pressure has been reached (i.e., the pressure measured by the pressure gauge 175 is within a predetermined tolerance of the second predetermined pressure, or is lower than or equal to the second predetermined pressure). The second predetermined pressure may be 0 psig (or 0 Pa). The predetermined tolerance of the second predetermined pressure may be the same as, or different from, the predetermined tolerance of the first predetermined pressure. The controller 101 may close the valve 199 and open the valve 198 to continue venting gas from the tank 110, including from the inner pressure vessel 112. After the purge cycle is performed, the controller 101 may control the system 100 to resume the rough pump cycle.

After performing the purge cycle, the controller 101 may continue the rough pump cycle. When needed (e.g., when the vacuum level measured by the vacuum gauge 130 does not indicate that the first predetermined vacuum level has been reached within the first predetermined time period), the controller 101 may repeat the purge cycle and the rough pump cycle (i.e., the rough-purge cycle or purge-rough cycle) repeatedly for a number of times until the vacuum gauge 130 indicates that the first predetermined vacuum level has been reached (e.g., the vacuum level measured by the vacuum gauge 130 is within a predetermined tolerance of the first predetermined vacuum level, or is lower than or equal to the first predetermined vacuum level) within the first predetermined time period during a rough pump cycle. For example, the controller 101 may repeat the rough-purge cycles for 10-20 cycles until, during a specific rough pump cycle, the signals from the vacuum gauge 130 indicate that a pressure of $1\times10^{-3}$ torr has been reached during the 10-minute preset time period after the start of the initial pump-down of that specific rough pump cycle.

After the first predetermined vacuum level has been reached during the rough pump cycle, the controller 101 may open the valve 165 to allow the turbo pump 131 to access the vacuum manifold 125 (e.g., to place the turbo pump 131 in fluid communication with the vacuum manifold 125). The controller 101 may operate at least one of the turbo pump 131 and the first roughing pump 133 to pump for a second predetermined time period. In some embodiments, only the turbo pump 131 is operated. In some embodiments, both the turbo pump 131 and the first roughing pump 133 are operated. Air and/or gas vacuumed from the annular space 113 may be vented to the atmosphere through the valve 198.

The second predetermined time period may be any suitable value. For example, the second predetermined time period may be approximately five (5) minutes. After the second predetermined time period has lapsed, the controller 101 may determine whether the vacuum level measured by the vacuum gauge 130 indicates that a second predetermined vacuum level has been reached (e.g., whether the measured vacuum level is within a predetermined tolerance level of the second predetermined vacuum level or is lower than or equal to the second predetermined vacuum level). The second predetermined vacuum level may be any suitable value. For example, the second predetermined vacuum level may be $5\times10^{-4}$ torr. In some embodiments, the predetermined tolerance of the second predetermined vacuum level may be between $-0.5\times10^{-4}$ torr and $+0.5\times10^{-4}$ torr. If the vacuum gauge 130 does not indicate a vacuum level of $5\times10^{-4}$ torr has been reached within the second predetermined time period (e.g., approximately five (5) minutes), the controller 101 may close the valve 165 and perform the purge-rough cycles until the vacuum gauge 130 indicates that $5\times10^{-4}$ torr vacuum level has been reached within the annular space 113 within the five-minute time period. For example, the controller 101 may perform the purge cycle described above, followed by the initial pump-down (i.e., initial part of the rough pump cycle) until the vacuum gauge 130 indicates that a vacuum level of $5\times10^{-4}$ torr has been reached within the second predetermined time period. Alternatively, in some embodiments, the controller 101 may operate the turbo pump 131 and/or the first rough pump 133 until the vacuum gauge indicates that a vacuum level of $5\times10^{-4}$ torr has been reached in the annular space 113, rather than operating the turbo pump 131 for the second predetermined time period (e.g., 5 minutes).

After the vacuum gauge 130 indicates that the $5\times10^{-4}$ torr vacuum level has been reached, the controller 101 may close the valve 165 and open the valve 155 that controls the fluid communication of the cryogenic pump 132 with the vacuum manifold 125. The controller 101 may operate the cryogenic pump 132 to pump for a third predetermined time period. The third predetermined time period may be any suitable value, for example, twenty (20) minutes. This vacuum cycle may be referred to as a normal vacuum stage of the rough pump cycle. Example valve settings for the normal vacuum stage are listed in Table 3.

TABLE 3

Normal Vacuum Stage Control Valve Settings

| Device | Status | Controls |
|---|---|---|
| Nitrogen Gas Heaters (e.g., heater 715) | On | Hot nitrogen gas supply @ 180° F. to 200° F. |
| Valve 155 | Open | Control access to the vacuum manifold 125 from the cryogenic pump 132 |
| Valve 199 | Closed | Control venting of gas within the annular space 113 to the atmosphere |
| Valve 190 | Open | Control purge gas to annular space 113 |
| Valve 170 | Closed | Control purge gas to and from the annular space 113 |
| Valve 156 | Closed | Control access to vacuum manifold 125 from second roughing pump 134 |
| Valve 165 | Closed | Control access to the vacuum manifold 125 from the turbo pump 131 |
| Valve 198 | Open | Vent gas control |
| Valve 142 | Open | Vacuum manifold isolation control |
| Valve 180 | Closed | Hot nitrogen gas supply control |

At the end of twenty (20) minutes, the controller 101 may close the valve 155 to close the fluid communication of the cryogenic pump 132 with the vacuum manifold 125, and repeat the purge-rough cycles until the vacuum gauge 130 indicates that a third predetermined vacuum level has been reached within the annular space 113 of the tank 110 (e.g., that the vacuum level measured by the vacuum gauge 130 is within a predetermined tolerance of the third predetermined vacuum level, or is lower than or equal to the third predetermined vacuum level). The third predetermined vacuum level may be a steady state vacuum level. The third predetermined vacuum level may be any suitable value. For example, the third predetermined vacuum level may be $1 \times 10^{-7}$ torr. The predetermined tolerance of the third predetermined vacuum level may be $-0.5 \times 10^{-7}$ torr to $+0.5 \times 10^{-7}$ torr.

The third predetermined vacuum level may be higher than a final, target vacuum level within the annular space 113 of the tank 110. For example, the target vacuum level within the annular space 113 may set as $1 \times 10^{-6}$ torr, and the third predetermined vacuum level may be set as $1 \times 10^{-7}$ torr, higher than the target vacuum level (numerical pressure $10^{-7}$ being smaller than $10^{-6}$). After the tank 110 reached the $1 \times 10^{-7}$ torr vacuum level, the tank 110 may be disconnected from the vacuum pumping subsystem 250. The tank 110 may be cooled down, such that the vacuum level inside the annular space 113 of the tank 110 may reach the target vacuum level of $1 \times 10^{-6}$ torr. In other words, the vacuum level inside the annular space 113, after the tank is cooled down, may be slightly lower than the third predetermined vacuum level reached in the annular space 113 during the vacuum acquisition process (i.e., the value of the final vacuum level is slightly higher than the value of the vacuum level achieved during the vacuum acquisition process). The vacuum within the annular space 113 may be maintained at the target vacuum level (e.g., $1 \times 10^{-6}$ torr) for a long period of time, such as 10 years, 20 years, etc., before re-pumping is needed.

Figure 10:
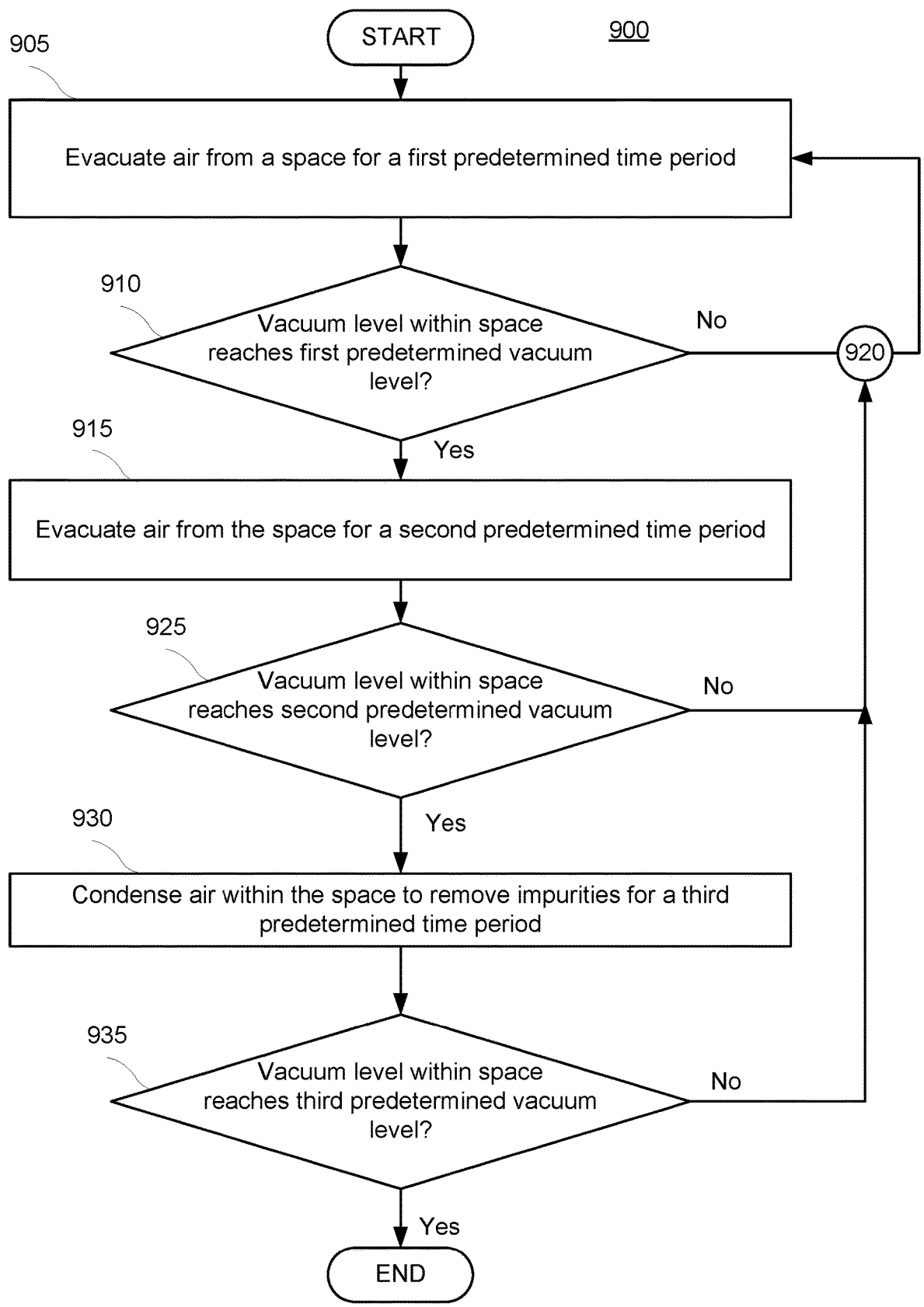
FIG. 10 is a flowchart illustrating a method for acquiring a predetermined vacuum level within a space of the tank, in accordance with the present disclosure.

FIG. 10 is a flowchart illustrating an exemplary method 900 for acquiring a predetermined vacuum level within the annular space 113 of the tank 110. The method 900 may be performed by the system 100. For example, the controller 101 may execute program codes stored in the memory 103 to perform the method 900. The controller 101 may receive signals from the sensors, gauges, and other devices included in the system 100, and may control the sensors, gauges, valves, pumps, and other devices to perform the method 900. The various sensors, gauges, valves, pumps, and other devices included in the system 100 may be in wired or wireless data communication with the controller 101.

The controller 101 may perform a rough pump cycle and a purge cycle repeatedly for as many times as needed (e.g., 1 time, 2 times, 3 times, 10 times, 20 times, etc.) until the predetermined vacuum level is reached in the annular space 113. First, the controller 101 may evacuate air from a space (e.g., the annular space 113) for a first predetermined time period (step 905). Step 905 may be referred to as an initial pump-down of a rough pump cycle. For example, the controller 101 may operate the second roughing pump 134 to perform an initial pump-down for ten (10) minutes or other suitable time period. The second roughing pump 134 may pump air (including gases and moisture, such as water vapor) out of the annular space 113 of the tank 110, and vent the air to the atmosphere through the valves 170 and 198.

The controller 101 may determine whether the vacuum level in the annular space 113 has reached a first predetermined vacuum level (step 910). For example, during the initial pump-down of the rough pump cycle, the controller 101 may receive signals from various sensors, including the vacuum gauge 130. The controller 101 may determine, based on the signals received from the vacuum gauge 130 that indicate a measured vacuum level within the annular space 113 of the tank 110, whether the vacuum level within the annular space 113 has reached the first predetermined vacuum level. The determination may be made within the first predetermined time period (e.g., 10 minutes), or right after the first predetermined time period has lapsed (e.g., at the end of the 10 minutes).

In one embodiment, the controller 101 may compare the measured vacuum level with the first predetermined vacuum level, and determine whether the measured vacuum level is within a predetermined tolerance associated with the first predetermined vacuum level. For example, the first predetermined vacuum level may be $1 \times 10^{-3}$ torr, and the predetermined tolerance may be within a range of $-0.5 \times 10^{-3}$ torr to $+0.5 \times 10^{-3}$ torr. When the difference between the measured vacuum level and the first predetermined vacuum level is within the predetermined tolerance, the controller 101 may determine that the first predetermined vacuum level has been reached ("Yes," step 910). When the difference between the measured vacuum level and the first predetermined vacuum level is outside of the predetermined tolerance, the controller 101 may determine that the first predetermined vacuum level has not been reached ("No," step 910). Alternatively, in some embodiments, the controller 101 may determine whether the measured numerical pressure value representing the vacuum level is lower than or equal to the numerical pressure value (e.g., $1 \times 10^{-3}$ torr) representing the first predetermined vacuum level. If the measured numerical pressure value is smaller than or equal to $1 \times 10^{-3}$ torr, the controller 101 may determine that the first predetermined vacuum level has been reached ("Yes," step 910). If the measured numerical pressure value is larger than $1 \times 10^{-3}$ torr, the controller 101 determines that the first predetermined vacuum level has not been reached ("No," step 910).

When the first predetermined vacuum level has not been reached within the first predetermined time period ("No", step 910), the controller 101 may perform a purge cycle 920, and then repeat the initial pump-down of the rough pump cycle by performing step 905. The purge-rough cycle (including steps 920, 905, and 910) may be repeated for a predetermined number of cycles (e.g., 10 to 20 cycles).

When the first predetermined vacuum level has been reached within the first predetermined time period ("Yes", step 910), the controller 101 may evacuate the air from the space for a second predetermined time period (step 915). In some embodiments, the controller 101 may operate at least one of the turbo pump 131 and the first roughing pump 133 to pump air out of the annular space 113 for a second predetermined time period (e.g., 5 minutes). Step 915 may be referred to as a normal vacuum stage of the rough pump cycle, which is discussed above.

The controller 101 may determine whether the vacuum level in the space (e.g., the annular space 113) has reached a second predetermined vacuum level (step 925). The determination may be made within the second predetermined time period (e.g., 5 minutes), or right after the second predetermined time period has lapsed (e.g., at the end of the 5 minutes). For example, the controller 101 may determine whether the vacuum level measured by the vacuum gauge 130 indicates that the second predetermined vacuum level (e.g., $5 \times 10^{-4}$ torr) has been reached. In one embodiment, the controller 101 may compare the measured vacuum level with the second predetermined vacuum level, and determine whether the measured vacuum level is within a predetermined tolerance associated with the second predetermined vacuum level. For example, the second predetermined vacuum level may be $5 \times 10^{-4}$ torr, and the predetermined tolerance may be within a range of $-0.5 \times 10^{-4}$ torr to $+0.5 \times 10^{-4}$ torr. When the difference between the measured vacuum level and the second predetermined vacuum level is within the predetermined tolerance, the controller 101 may determine that the second predetermined vacuum level has been reached ("Yes," step 925). When the difference between the measured vacuum level and the second predetermined vacuum level is outside of the predetermined tolerance, the controller 101 may determine that the second predetermined vacuum level has not been reached ("No," step 925).

Alternatively, in some embodiments, the controller 101 may determine whether the measured numerical pressure value representing the vacuum level is smaller than or equal to the numerical pressure value (e.g., $5 \times 10^{-4}$ torr) representing the second predetermined vacuum level. If the measured numerical pressure value is smaller than or equal to the numerical pressure value (e.g., $5 \times 10^{-4}$ torr) representing the second predetermined vacuum level, the controller 101 may determine that the second predetermined vacuum level has been reached ("Yes," step 925). If the measured vacuum level is larger than the numerical pressure value (e.g., $5 \times 10^{-4}$ torr) representing the second predetermined vacuum level, the controller 101 may determine that the second predetermined vacuum level has not been reached ("No," step 925).

If the second predetermined vacuum level (e.g., $5 \times 10^{-4}$ torr) has not been reached ("No," step 925), the controller 101 may repeat the purge cycle 920, the rough pump cycle including steps 905, 910, 915, and 925 (collectively, the purge-rough cycle). The controller 101 may repeat the purge-rough cycle as many times as needed until the second predetermined vacuum level is reached within the second predetermined time period.

When the second predetermined vacuum level (e.g., $5 \times 10^{-4}$ torr) has been reached within the second predetermined time period ("Yes," step 925), the controller 101 may condense the air within the annular space 113 to remove impurities for a third predetermined time period (step 930). For example, the controller 101 may operate the cryogenic pump 132 to condense the air in the annular space 113 to remove impurities such as water vapor and/or gases for twenty (20) minutes.

At the end of the twenty-minute time period, the controller 101 may determine whether the vacuum level in the annular space 113 of the tank 110 (e.g., the vacuum level measured by the vacuum gauge 130) indicates that a third predetermined vacuum level (e.g., $1 \times 10^{-7}$ torr) has been reached (step 935). In one embodiment, the controller 101 may compare the measured vacuum level with the third predetermined vacuum level, and determine whether the measured vacuum level is within a predetermined tolerance associated with the third predetermined vacuum level. For example, the third predetermined vacuum level may be $1 \times 10^{-7}$ torr, and the predetermined tolerance may be within a range of $-0.5 \times 10^{-7}$ torr to $+0.5 \times 10^{-7}$ torr. When the difference between the measured vacuum level and the third predetermined vacuum level is within the predetermined tolerance, the controller 101 may determine that the third predetermined vacuum level has been reached ("Yes," step 935). When the difference between the measured vacuum level and the third predetermined vacuum level is outside of the predetermined tolerance, the controller 101 may determine that the third predetermined vacuum level has not been reached ("No," step 935).

Alternatively, in some embodiments, the controller 101 may determine whether the measured numerical pressure value representing the vacuum level is smaller than or equal to the numerical pressure value (e.g., $1 \times 10^{-7}$ torr) representing the third predetermined vacuum level. If the measured vacuum level is smaller than or equal to the numerical pressure value (e.g., $1 \times 10^{-7}$ torr) representing the third predetermined vacuum level, the controller 101 may determine that the third predetermined vacuum level has been reached ("Yes," step 935). If the measured vacuum level is larger than the numerical pressure value (e.g., $1 \times 10^{-7}$ torr) representing the third predetermined vacuum level, the controller 101 may determine that the third predetermined vacuum level has not been reached ("No," step 935).

When the third predetermined vacuum level has not been reached ("No," step 935), the controller 101 may repeat steps 920, 905, 910, 915, 925, 930, and 935 (e.g., repeat the purge-rough cycle as many times as needed) until the third predetermined vacuum level has been reached. When the third predetermined vacuum level has been reached ("Yes," step 935), the controller 101 may terminate the vacuum acquisition process (i.e., method 900). After the third predetermined vacuum level (e.g., $1 \times 10^{-7}$ torr) has been reached, the tank 110 may be cooled down (e.g., by supplying LNG into the pressure vessel 112). After the tank 110 is cooled down, the vacuum level within the annular space 113 of the tank 110 may be slightly lower than the third predetermined vacuum level. For example, the vacuum level within the annular space 113 may be, e.g., $1 \times 10^{-6}$ torr. This vacuum level may be maintained within the annular space 113 for a long period of time, e.g., 10 years, 20 years, etc.

Figure 11:
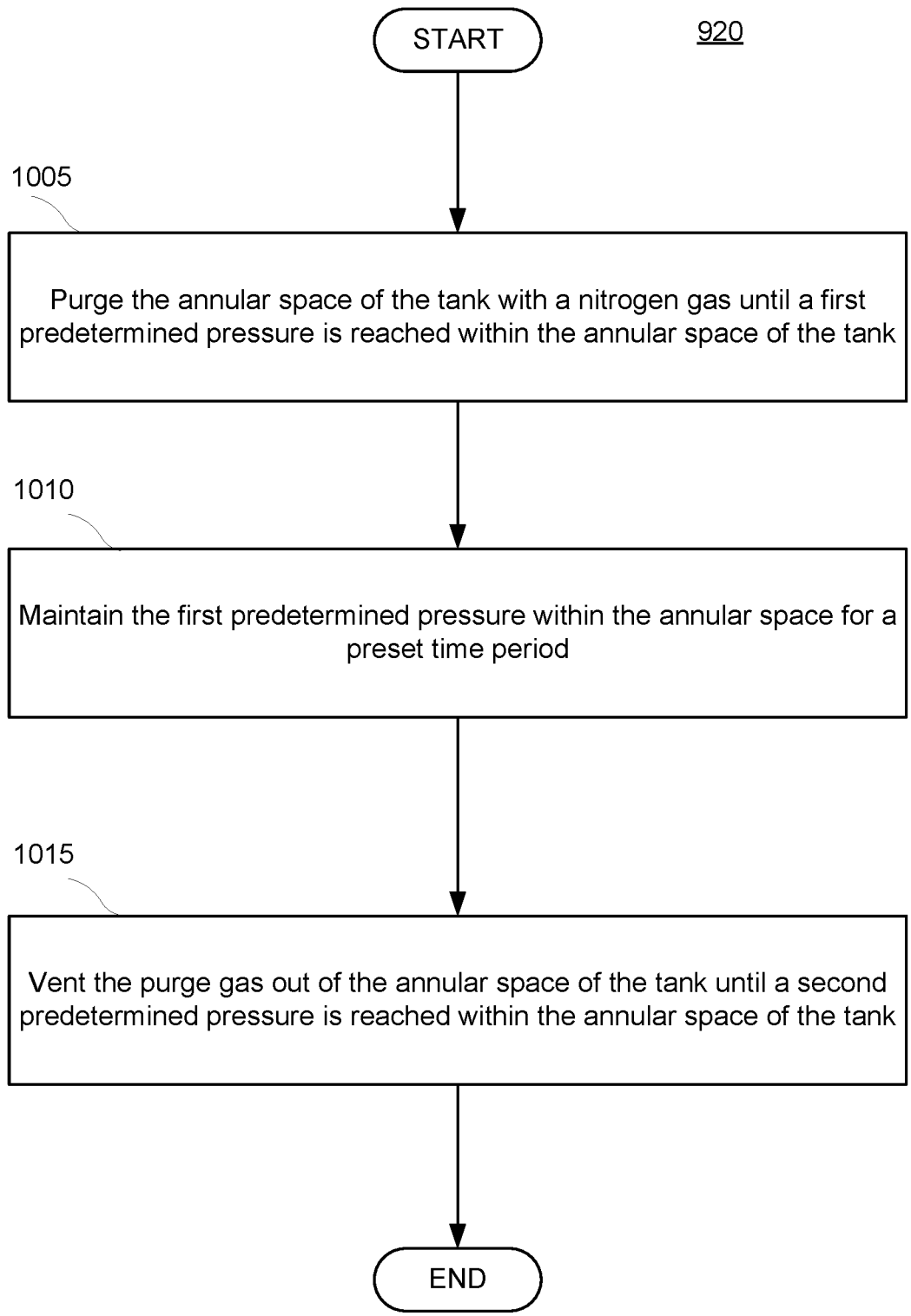
FIG. 11 is a flowchart illustrating steps of the purge cycle shown in FIG. 10, in accordance with the present disclosure.

FIG. 11 is a flowchart illustrating steps of the exemplary purge cycle 920 shown in FIG. 10. During the purge cycle 920, the controller 101 may control various valves to supply a purge gas (e.g., a nitrogen gas) into the annular space 113 of the tank 110, and vent the purge gas out of the annular space 113. The purge cycle 920 may include purging the annular space 113 of the tank 110 with a nitrogen gas until a first predetermined pressure is reached within the annular space 113 of the tank 110 (step 1005). Other suitable gas (e.g., inert gas) may also be used as a purge gas. In some embodiments, the controller 101 may cause a nitrogen gas supply system that includes the tank 182, the vaporizer 183, and the valve 184 shown in FIG. 2A to supply the nitrogen gas to the tank 110. The controller 101 may open the valve 190 and the valve 180 or keep the valves 180 and 190 in open states (if they are already opened) while hot nitrogen gas is supplied into the tank 110 until the pressure gauge 175 indicates a first predetermined pressure has been reached. The first predetermined pressure may be any suitable value, e.g., 5 psig (or 34473.79 Pa). When a pressure measured by the pressure gauge 175 is within a predetermined tolerance associated with the first predetermined pressure, the first predetermined pressure is reached. For example, the predetermined tolerance may be a range between −0.1 psig (or −689.48 Pa) and 0.1 psig (or +689.48 Pa). When the difference between the measured pressure and the first predetermined pressure is within the predetermined tolerance, the controller 101 may determine that the first predetermined pressure has been reached. When the difference between the measured pressure and the first predetermined pressure is outside of the predetermined tolerance, the controller 101 may determine that the first predetermined pressure has not been reached. Alternatively, in some embodiments, the controller 101 may determine that the first predetermined pressure has been reached when the measured pressure is higher than or equal to the first predetermined pressure, and that the first predetermined pressure has not been reached when the measured pressure is lower than the first predetermined pressure. Other suitable pressure may be used as the first predetermined pressure. In addition, other predetermined tolerance may be used for determining whether the measured pressure has reached the first predetermined pressure.

The controller 101 may operate the system 100 to maintain the first predetermined pressure within the annular space 113 for a preset time period (step 1010). For example, the preset time period may be 1 minute, 2 minutes, etc. In some embodiments, the controller 101 may close the valves 180 and 190 and maintain the first predetermined pressure within the annular space 113 of the tank 110 for 1 minute.

The controller 101 may operate the system 100 to vent the purge gas out of the annular space 113 of the tank 110 until a second predetermined pressure is reached within the annular space 113 of the tank 110 (step 1015). For example, the controller 101 may open valves 170 and 199 such that the nitrogen gas is vented out of the annular space 113 of the tank 110 and vented to the atmosphere through the valve 199, until the pressure gauge 175 indicates the second predetermined pressure has been reached inside the annular space 113. The second predetermined pressure may be 0 psig (or 0 Pa). Other suitable pressure may also be used as the second predetermined pressure. When a pressure measured by the pressure gauge 175 is within a predetermined tolerance associated with the second predetermined pressure, the second predetermined pressure is reached. For example, the predetermined tolerance may be a range between −0.1 psig (or −689.48 Pa) and 0.1 psig (or +689.48 Pa). When a pressure measured by the pressure gauge 175 is within a predetermined tolerance associated with the first predetermined pressure, the first predetermined pressure is reached. For example, the predetermined tolerance may be a range between −0.1 psig (or −689.48 Pa) and 0.1 psig (or +689.48 Pa). When the difference between the measured pressure and the second predetermined pressure is within the predetermined tolerance, the controller 101 may determine that the second predetermined pressure has been reached. When the difference between the measured pressure and the second predetermined pressure is outside of the predetermined tolerance, the controller 101 may determine that the second predetermined pressure has not been reached. Alternatively, in some embodiments, the controller 101 may determine that the second predetermined pressure has been reached when the measured pressure is lower than or equal to the second predetermined pressure, and that the second predetermined pressure has not been reached when the measured pressure is higher than the second predetermined pressure. Other predetermined tolerance may also be used for determining whether the measured pressure has reached the second predetermined pressure.

After the second predetermined pressure has been reached within the annular space 113 of the tank 110, the controller 101 may close the valve 199 and open the valve 198 to continue venting gas from the annular space 113 of the tank 110. The controller 101 may end the purge cycle and repeat the rough pump cycle 905 in FIG. 10.

Further modifications and alternative embodiments of various aspects of the present teachings will be apparent to those skilled in the art in view of this description.

It is to be understood that the particular examples and embodiments set forth herein are non-limiting, and modifications to structure, dimensions, materials, and methodologies may be made without departing from the scope of the present teachings.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiments described herein be considered as exemplary only.

What is claimed is:

1. A system for acquiring a vacuum level in a space of a container, comprising:
   at least one roughing pump;
   a turbo pump;
   a cryogenic pump;
   a vacuum manifold, wherein each of the at least one roughing pump, the turbo pump, and the cryogenic pump are fluidly coupled to the vacuum manifold by conduit, and wherein the vacuum manifold is fluidly coupled to the space of the container; and
   a controller configured to control operations of the at least one roughing pump, the turbo pump, and the cryogenic pump, wherein the controller is configured to:
      control the at least one roughing pump to evacuate the space;
      initiate supplying a gas into the space to purge the space;
      control the turbo pump to further evacuate the space; and
      control the cryogenic pump to condense air in the space and remove water vapor from the air, wherein
   the controller is further configured to operate each pump for a predetermined period of time and to determine a vacuum level of the space after each predetermined period of time for each of the roughing pump, the turbo pump, and the cryogenic pump;
an oven in which the container is placed during a vacuum acquisition process.

2. A system for acquiring a vacuum level in a space of a container comprising:
at least one roughing pump;
a turbo pump;
a cryogenic pump;
a vacuum manifold, wherein the at least one roughing pump, the turbo pump, and the cryogenic pump are fluidly coupled by, conduits to the vacuum manifold, and wherein the vacuum manifold is fluidly coupled to the space of the container; and
a controller configured to control operations of the at least one roughing pump, the turbo pump, and the cryogenic pump, wherein
the controller is configured to:
control the at least one roughing pump to evacuate the space;
initiate supplying a gas into the space to purge the space;
control the turbo pump to further evacuate the space; and
control the cryogenic pump to condense air in the space and remove water vapor from the air, wherein
the controller is further configured to operate each pump for a predetermined period of time and to determine a vacuum level of the space after each predetermined period of time for each of the roughing pump, the turbo pump, and the cryogenic pump,
wherein the controller is further configured to:
operate the roughing pump for a first predetermined period of time and until a first predetermined vacuum level is reached in the space;
operate the turbo pump for a second predetermined period of time and until a second predetermined vacuum level is reached in the space; and
operate the cryogenic pump for a third predetermined period of time and until a third predetermined vacuum level is reached in the space,
wherein the first, second, and third predetermined periods of time are different amounts of time;
an oven in which the container is placed during a vacuum acquisition process.

3. A system for acquiring a vacuum level in a space of a container, comprising:
at least one roughing pump;
a turbo pump;
a cryogenic pump;
a vacuum manifold, wherein the at least one roughing pump, the turbo pump, and the cryogenic pump are fluidly coupled to the vacuum manifold, and wherein the vacuum manifold is fluidly coupled to the space of the container; and
a controller configured to control operations of the at least one roughing pump, the turbo pump, and the cryogenic pump, wherein
the controller is configured to:
control the at least-one roughing pump to evacuate the space;
initiate supplying a gas into the space to purge the space;
control the turbo pump to further evacuate the space; and
control the cryogenic pump to condense air in the space and remove water vapor from the air, wherein
the controller is further configured to operate each pump for a predetermined period of time and to determine a vacuum level of the space after each predetermined period of time for each of the roughing pump, the turbo pump, and the cryogenic pump,
wherein the at least one roughing pump, the turbo pump, and the cryogenic pump are fluidly coupled to a pump manifold that is fluidly coupled to the vacuum manifold through a valve.

4. The system of claim 1, wherein a temperature range in the oven is kept at 180° F. to 200° F. during the vacuum acquisition process.

5. The system of claim 2, wherein the controller is configured to cease operation of the roughing pump when the first predetermined vacuum level is reached, wherein the first predetermined vacuum level is $1 \times 10^{-3}$ torr.

6. The system of claim 2, wherein the controller is configured to cease operation of the turbo pump when the second predetermined vacuum level is reached, wherein the second predetermined vacuum level is $5 \times 10^{-4}$ torr.

7. The system of claim 2, wherein the controller is configured to cease operation of the cryogenic pump when the third predetermined vacuum level is reached wherein the third predetermined vacuum level is $1 \times 10^{-7}$ torr.

8. The system of claim 7, wherein a target vacuum level within the space of the container is $1 \times 10^{-6}$ torr.

* * * * *